US012118907B2

(12) United States Patent
Jang et al.

(10) Patent No.: US 12,118,907 B2
(45) Date of Patent: Oct. 15, 2024

(54) DISPLAY APPARATUS

(71) Applicant: LG Display Co., Ltd., Seoul (KR)

(72) Inventors: Youngin Jang, Paju-si (KR); Subin Kim, Paju-si (KR); KyungYun Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/359,657

(22) Filed: Jul. 26, 2023

(65) Prior Publication Data

US 2024/0096252 A1 Mar. 21, 2024

(30) Foreign Application Priority Data

Sep. 15, 2022 (KR) ........................ 10-2022-0116264

(51) Int. Cl.
*G09G 3/00* (2006.01)
*G09G 5/02* (2006.01)

(52) U.S. Cl.
CPC ............... *G09G 3/006* (2013.01); *G09G 5/02* (2013.01)

(58) Field of Classification Search
CPC .. G09G 2330/12; G09G 3/006; G09G 3/3275; G09G 3/3233; G09G 3/3208
See application file for complete search history.

(56) References Cited

U.S. PATENT DOCUMENTS 8,415,965 B2 * 4/2013 Cho ........................ G09G 3/006 324/760.01
2016/0379906 A1 * 12/2016 Kim ..................... G09G 3/3688 257/48
2019/0392743 A1 * 12/2019 Lee ........................ G09G 3/006

FOREIGN PATENT DOCUMENTS

KR 10-2007-0063310 A 6/2007
KR 10-0806885 B1 2/2008
KR 10-2103840 B1 4/2020

* cited by examiner

*Primary Examiner* — Koosha Sharifi-Tafreshi
(74) *Attorney, Agent, or Firm* — Fenwick & West LLP

(57) ABSTRACT

A display apparatus includes a display panel in which pixels, signal lines connected to the pixels, and gate lines supplying gate signals to the pixels are provided, and link lines provided on a rear surface of the display panel and connected to the signal lines provided on a front surface of the display panel, wherein a test unit is provided at ends of the link lines on the rear surface.

13 Claims, 12 Drawing Sheets

DISPLAY APPARATUS

CROSS-REFERENCE TO RELATED APPLICATIONS

This application claims the benefit of the Korean Patent Application No. 10-2022-0116264 filed on Sep. 15, 2022, which is hereby incorporated by reference as if fully set forth herein.

FIELD OF THE INVENTION

The present disclosure relates to a display apparatus.

BACKGROUND ART

Display apparatus is mounted on electronic products such as televisions, monitors, notebook computers, smart phones, tablet computers, electronic pads, wearable devices, watch phones, portable information devices, navigation devices, or vehicle control display apparatus, and use as a display screen displaying images.

A display apparatus includes a display panel including pixels, a data driver supplying a data voltage to a data line, and a gate driver supplying a gate signal to a gate line.

A non-display area in which an image is not output is provided at a border or an edge of a display panel.

Recently, in order to increase the immersion of a user, a width of a non-display area has been progressively reduced, and a display panel including almost no non-display area has been proposed.

SUMMARY

In a process of manufacturing a display panel with almost no non-display area, it may be determined whether light is normally output from pixels by a light emission test device. However, after a display panel with almost no non-display area is manufactured, it cannot be determined whether light is normally output from pixels by a light emission test device. Accordingly, the inventor of the present disclosure has invented a display apparatus in which it is possible to determine whether light is normally output from pixels using a light emission test device even after a display panel with almost no non-display area is manufactured.

Accordingly, the present disclosure is directed to providing a display apparatus that substantially obviates one or more problems due to limitations and disadvantages of the related art.

An aspect of the present disclosure is directed to providing a display apparatus in which test unit is provided at ends of link lines provided on a rear surface of a display panel.

Another aspect of the present disclosure is directed to providing a display apparatus in which main pads connected to ends of link lines are provided on each of at least two jig units provided on a rear surface of a display panel.

Another aspect of the present disclosure is directed to providing a display apparatus in which main pads connected to ends of link lines and secondary pads apart from the main pads are provided in each of at least two jig units provided on the rear surface of a display panel.

Another aspect of the present disclosure is directed to providing a display apparatus in which a test unit provided on the rear surface of a display panel is apart from link lines provided on the rear surface of the display panel.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus including a display panel in which pixels, signal lines connected to the pixels, and gate lines supplying gate signals to the pixels are provided, and link lines provided on a rear surface of the display panel and connected to the signal lines provided on a front surface of the display panel, wherein test unit is provided at ends of the link lines on the rear surface.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
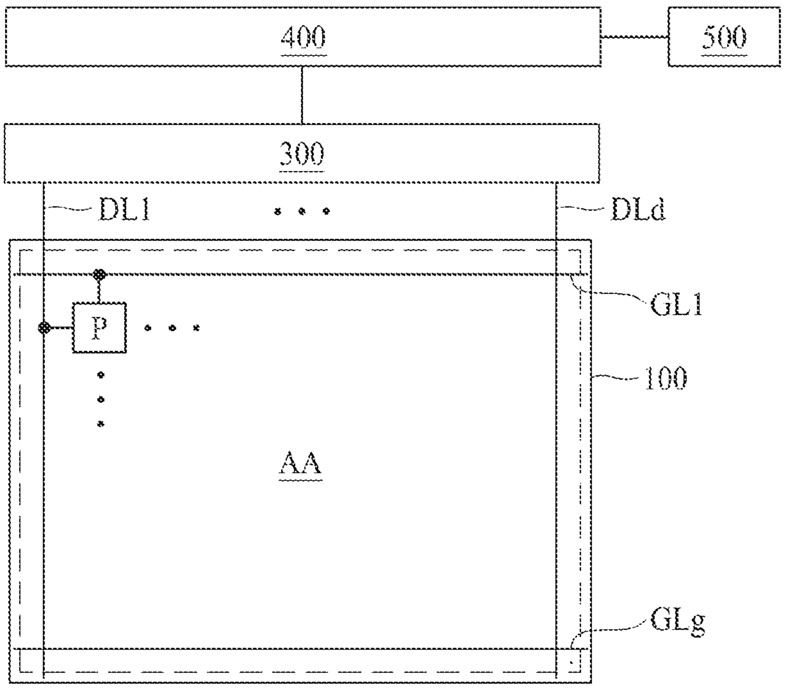
FIG. 1 is an exemplary diagram illustrating a display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element or layer is "connected," "coupled," or "adhered" to another element or layer indicates that the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
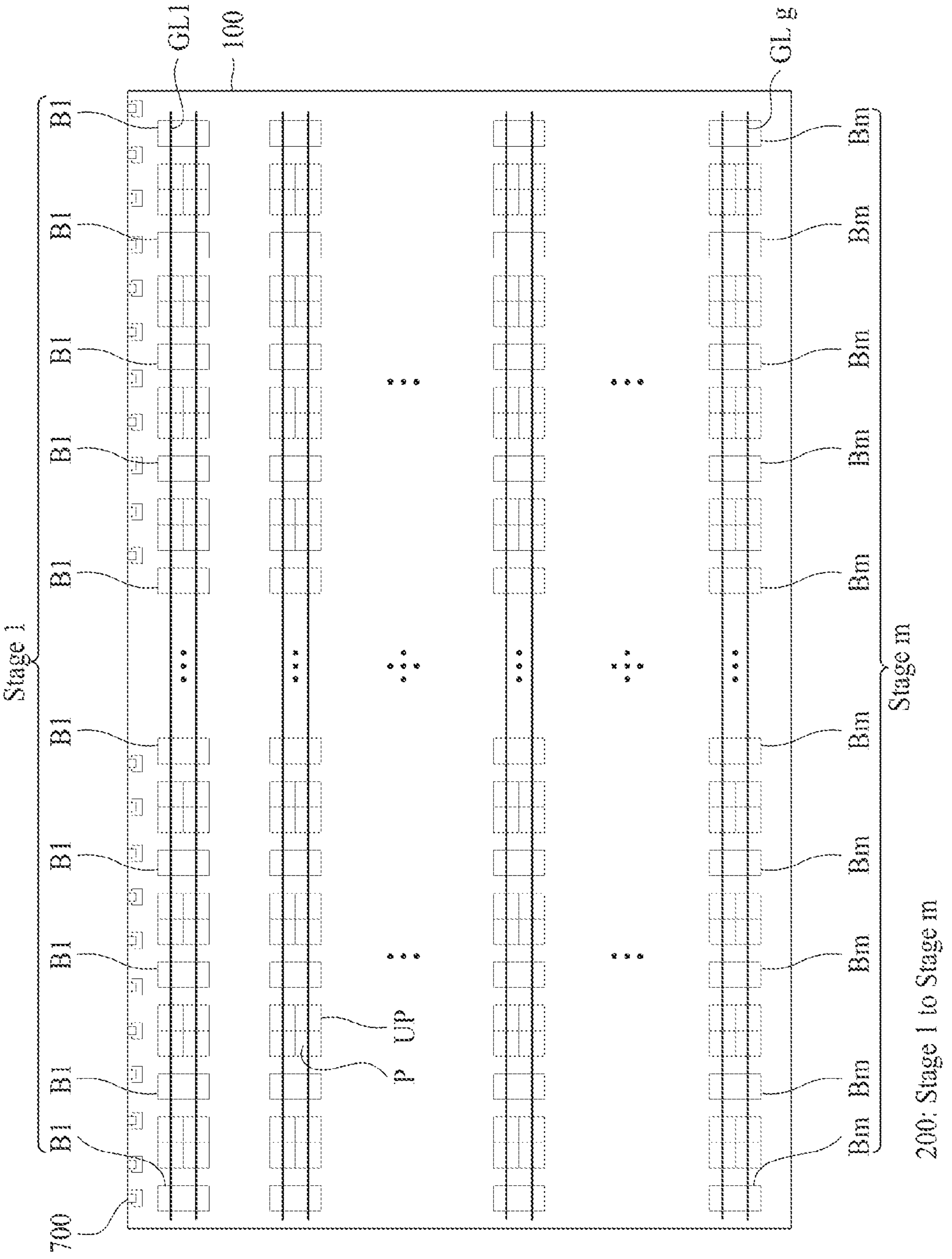
FIG. 2 is a plan view illustrating a display panel illustrated in FIG. 1.
Figure 3:
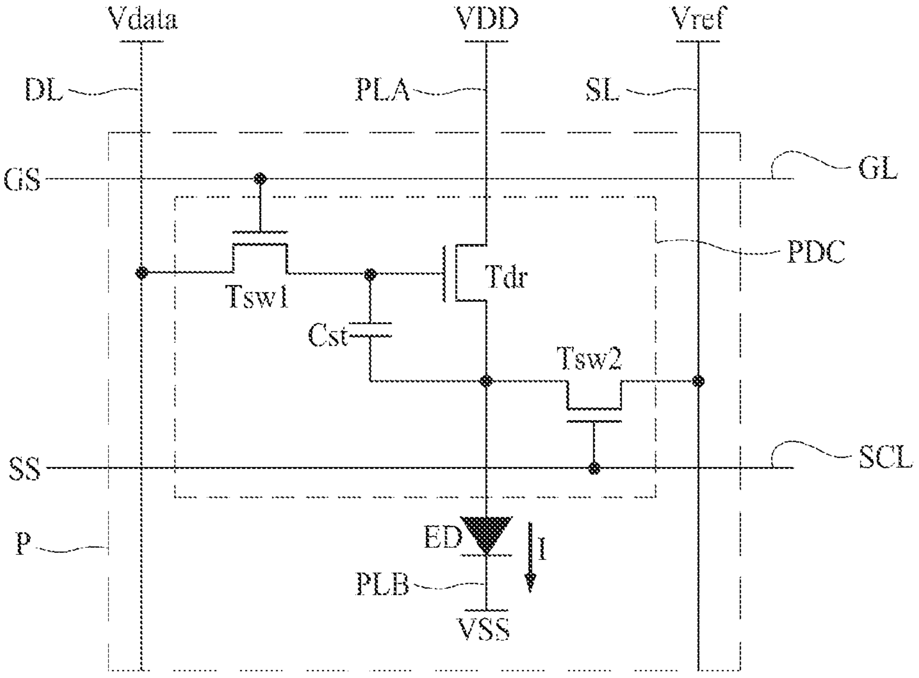
FIG. 3 is an exemplary diagram illustrating a structure of a pixel illustrated in FIG. 1.

FIG. 1 is an exemplary diagram illustrating a display apparatus according to an embodiment of the present disclosure, FIG. 2 is a plan view illustrating a display panel illustrated in FIG. 1, and FIG. 3 is an exemplary diagram illustrating a structure of a pixel illustrated in FIG. 1.

A display apparatus according to an embodiment of the present disclosure may be an electronic device such as a notebook computer, a television, a monitor, a smart phone, a tablet PC, and an automotive display apparatus, or may be included in an electronic device.

The display apparatus according to an embodiment of the present disclosure, as illustrated in FIGS. 1 and 2, may include a display panel 100 which includes a display area AA displaying an image, a gate driver 200 which supplies a gate signal GS to a plurality of gate lines GL1 to GLg provided in the display area AA of the display panel 100, a data driver 300 which supplies data voltages to a plurality of data lines DL1 to DLd provided in the display panel 100, a controller 400 which controls driving of the gate driver 200 and the data driver 300, and a power supply 500 which supplies power to the controller, the gate driver, the data driver, and the light emitting display panel.

Particularly, in the display apparatus according to the embodiment of the present disclosure, stages included in the gate driver 200 may be provided in the display area AA. Accordingly, the display panel 100 having no or almost no non-display area surrounding the display area AA may be implemented. Therefore, in FIG. 1, the non-display area is not displayed outside the display area AA.

First, pixels P displaying an image may be provided in the display area AA of the display panel 100.

As described above, because the gate driver 200 connected to the gate lines GL1 to GLg may be provided in the display area AA, the non-display area for the gate driver 200 may be omitted. Accordingly, a width of the non-display area may be reduced compared to the related art, or the non-display area may be omitted.

The gate lines GL1 to GLg, the data lines DL1 to DLd, and the pixels P may be provided in the display area AA. Accordingly, the display area AA may display an image. Here, g and d may each be a natural number.

The pixel P included in the display panel 100, as illustrated in FIG. 3, may include a pixel driving circuit PDC which includes a switching transistor Tsw1, a storage capacitor Cst, a driving transistor Tdr, and a sensing transistor Tsw2, and an emission unit which includes a light emitting device ED.

A structure of the pixel P included in the display panel 100 is not limited to a structure illustrated in FIG. 3. Accordingly, a structure of the pixel P may be changed to various shapes.

Particularly, the structure of the pixel P applied to an embodiment of the present disclosure may be changed to various types on the basis of a pixel compensation method.

For example, according to an internal compensation method and an external compensation method, a current I flowing to the light emitting device ED may not be affected by a threshold voltage of the driving transistor Tdr. Accordingly, even when a threshold voltage of the driving transistor Tdr varies as the display apparatus is used for a long time, light may be normally output from the light emitting device ED.

As illustrated in Equation 1, the internal compensation method is a method in which the current I flowing to the light emitting device ED is not affected by a threshold voltage Vth of the driving transistor Tdr by removing the threshold voltage Vth of the driving transistor Tdr from an equation which is used for calculating a current I flowing to the light emitting device ED. In the Equation 1, Vinit may be a second voltage Vref illustrated in FIG. 3 or may be a voltage supplied through a separate line. In Equation 1, k may be a constant used to calculate the current I.

$$I = \frac{1}{2}k(Vgs - Vth)^2 = \frac{1}{2}k[\cancel{Vsp} + \cancel{Vth} + Vdata - Vinit - \cancel{Vsp} - \cancel{Vth}]^2 = \frac{1}{2}k[Vdata - Vinit]^2 \quad \text{[Equation 1]}$$

The external compensation method measures, for example, the amount of change in the threshold voltage of the driving transistor Tdr through the sensing transistor Tsw2 and the sensing line SL, and changes the level of the data voltage Vdata supplied to the data line DL on the basis of the amount of change in the threshold voltage. In this case, at least one of the voltages (VDD, Vref, etc.) supplied to the pixel P may be different for each pixel. For example, the first voltages VDD of the same level may be supplied to all pixels P, and the second voltages Vref supplied to the pixels P may be different from each other.

The compensation method may not be a feature of the display apparatus according to an embodiment of the present disclosure, and thus, detailed descriptions of the internal compensation method and the external compensation method are omitted.

However, in the display apparatus according to an embodiment of the present disclosure, the shape of the pads provided in the test unit may be variously changed based on the compensation method. Descriptions thereof will be described in detail with reference to FIG. 11.

The data driver 300 may supply data voltages to the data lines DL1 to DLd.

The controller 400 may realign input image data transferred from an external system by using a timing synchronization signal transferred from the external system and may generate a data control signal DCS which is to be supplied to the data driver 300 and a gate control signal GCS which is to be supplied to the gate driver 200.

To this end, the controller 400 may include a data aligner which realigns input image data to generate image data Data and supplies the image data Data to the data driver 300, a control signal generator which generates the gate control signal GCS and the data control signal DCS by using the timing synchronization signal, an input unit which receives the timing synchronization signal and the input image data transferred from the external system and respectively transfers the timing synchronization signal and the input image data to the data aligner and the control signal generator, and an output unit which supplies the data driver 300 with the image data Data generated by the data aligner and the data control signal DCS generated by the control signal generator and supplies the gate driver 200 with the gate control signal GCS generated by the control signal generator.

The external system may perform a function of driving the controller 400 and an electronic device. For example, when the electronic device is a TV, the external system may receive various sound information, image information, and letter information over a communication network and may transfer the received image information to the controller 400. In this case, the image information may be the input image data.

The power supply 500 may generate various powers and may supply the generated powers to the controller 400, the gate driver 200, the data driver 300, and the display panel 100.

Finally, the gate driver 200 may supply gate pulses to the gate lines GL1 to GLg. When the gate pulse generated by the gate driver 200 is supplied to the gate of the switching transistor Tsw1 included in the pixel P, the switching transistor Tsw1 may be turned on. When the switching transistor Tsw1 is turned on, a data voltage supplied through a data line may be supplied to the pixel P. When a gate off signal generated by the gate driver 200 is supplied to the switching transistor Tsw1, the switching transistor Tsw1 may be turned off. When the switching transistor Tsw1 is turned off, a data voltage may not be supplied to the pixel P any longer. The gate signal GS supplied to the gate line GL may include the gate pulse and the gate off signal.

The gate driver 200 may include stages Stage 1 to Stage m, and the stages Stage 1 to Stage m may be connected to gate lines GL1 to GLg. The stages Stage 1 to Stage m may be provided in the display panel 100, and particularly, may be provided in the display area AA. Here, m may be a natural number less than or equal to g.

The gate driver 200 may include stages Stage 1 to Stage m for sequentially outputting gate pulses to the gate lines GL1 to GLg. Each of the stages Stage 1 to Stage m may include stage transistors. In this case, the transistors included in the stages Stage 1 to Stage m may be provided in a display area AA of a front surface of the display panel 100.

For example, as illustrated in FIG. 2, a first stage Stage 1 configuring the gate driver 200 may include first branch circuit units B1, and each of the first branch circuit units B1 may include at least one transistor included in the first stage Stage 1. Moreover, an mth stage Stage m configuring the gate driver 200 may include mth branch circuit units Bm, and each of the mth branch circuit units Bm may include at least one transistor included in the mth stage Stage m.

Each of the stages includes branch circuit units, and at least one transistor is provided in each of the branch circuit units. Hereinafter, for convenience of description, the present disclosure will be described by using the first branch circuit units B1 configuring the first stage Stage 1. Accordingly, descriptions of the first branch circuit units B1 may be identically applied to branch circuit units included in second to mth stages.

The first branch circuit units B1, for example, as illustrated in FIG. 2, may be provided between unit pixels UP configured with four pixels P arranged along a gate line GL. The unit pixel UP, for example, may include a white pixel W, a red pixel R, a green pixel G, and a blue pixel B.

However, the first branch circuit units B1 may be provided between two pixels P adjacent to each other along a gate line. That is, the first branch circuit units B1 may be provided between the pixels P in various shapes.

In this case, each of the first stage Stage 1 to the mth stage Stage m may be connected to at least one gate line. That is, each of the first stage Stage 1 to the mth stage Stage m may output gate pulses to one gate line, or may output gate pulses to two gate lines, or may output gate pulses to three or more gate lines.

Figure 4:
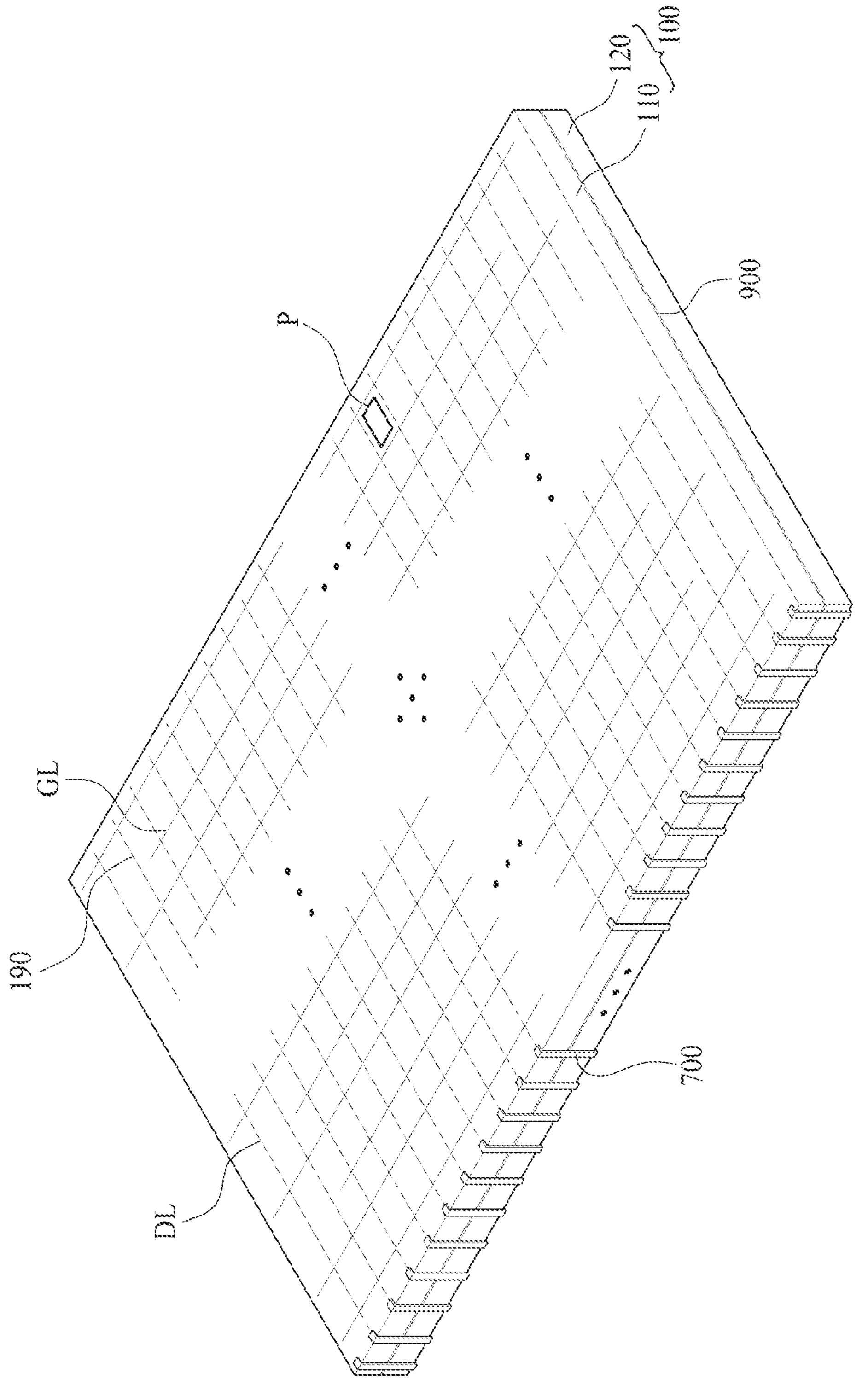
FIG. 4 is a perspective view illustrating a front surface of a display apparatus according to the present disclosure.
Figure 5:
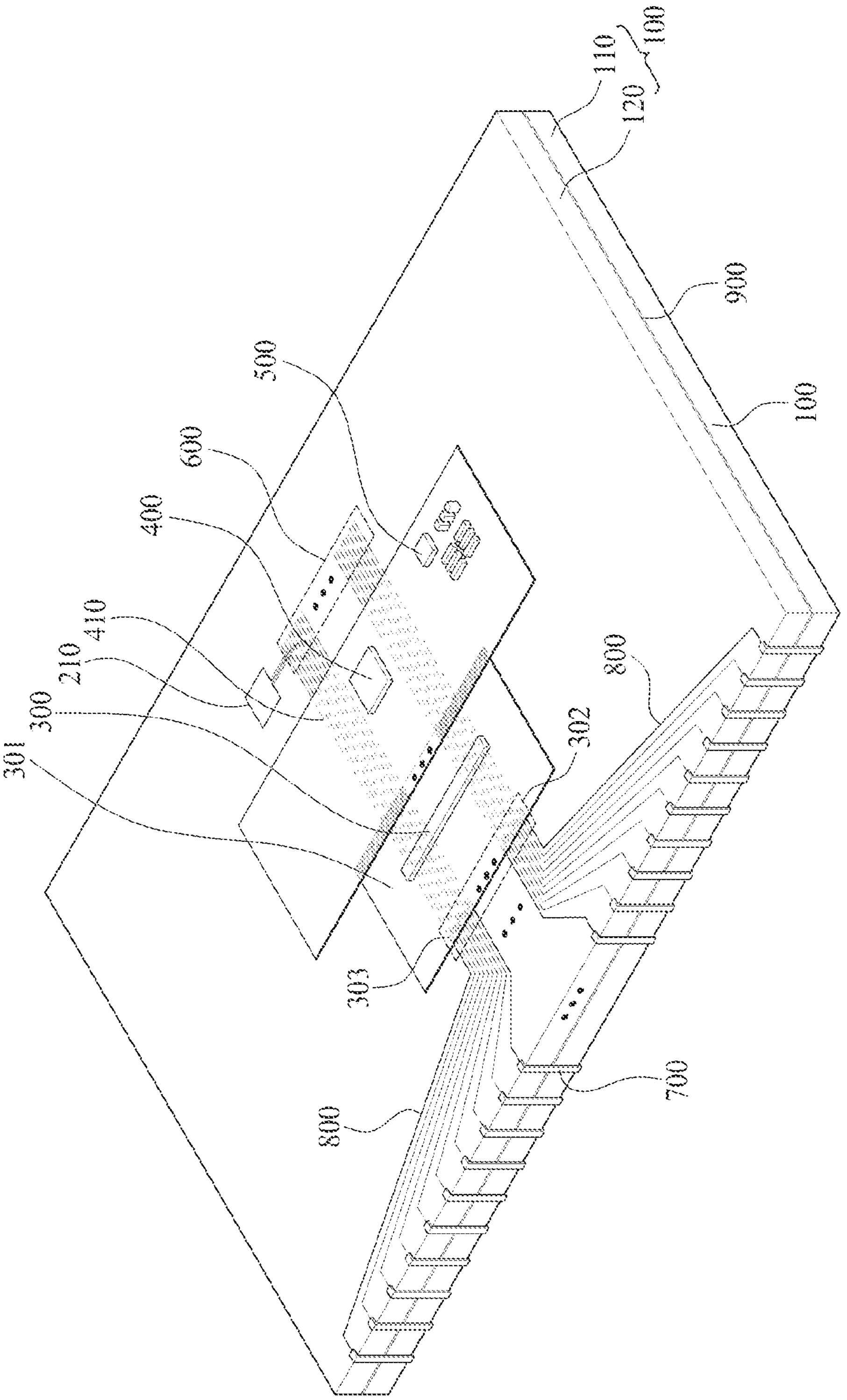
FIG. 5 is a perspective view illustrating a rear surface of a display apparatus according to the present disclosure.
Figure 6:
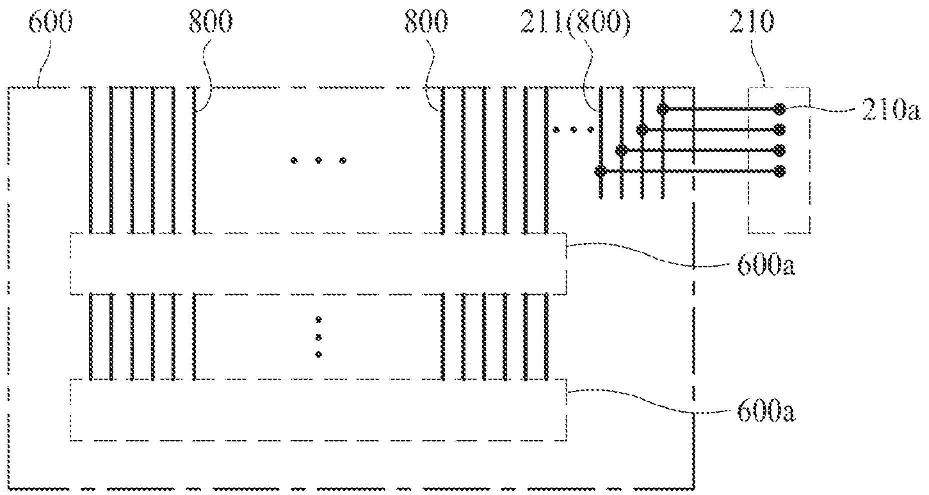
FIG. 6 is an exemplary diagram schematically illustrating a test unit and a gate pad unit illustrated in FIG. 5.

FIG. 4 is a perspective view illustrating a front surface of a display apparatus according to the present disclosure, FIG. 5 is a perspective view illustrating a rear surface of a display apparatus according to the present disclosure, and FIG. 6 is an exemplary diagram schematically illustrating a test unit and a gate pad unit illustrated in FIG. 5.

As described above, the display apparatus according to an embodiment of the present disclosure may include the display panel 100, the gate driver 200, the data driver 300, the controller 400, and the power supply 500. In the following description, details which are the same or similar to details described above are omitted or will be briefly described.

Pixels P, a first gate line GL1 to a gth gate line GLg, and data lines DL1 to DLd may be provided in the display panel 100. Particularly, as illustrated in FIG. 4, the pixels P, the gate lines GL, and the data lines DL may be provided on the front surface of the display panel 100.

As illustrated in FIGS. 4 and 5, a routing line 700 may be provided in the lateral surface of the display panel 100, and as illustrated in FIG. 5, link lines 800 connected to the data lines DL and power supply lines may be provided in the rear surface of the display panel 100. Moreover, a test unit 600 and a gate pad unit 210 may be provided at ends of the link lines 800 on the rear surface of the display panel 100.

First, gate lines GL, data lines DL, power supply lines, and at least one clock line may be provided on the front surface of the display panel 100.

The power supply lines, for example, may include a line supplying a first voltage VDD to the light emitting device ED (hereinafter simply referred to as a first voltage supply line PLA), a line supplying a second voltage Vref to a pixel driving circuit PDC (hereinafter simply referred to as a second voltage supply line SL), a line PLB supplying a third voltage VSS to the light emitting device ED, and at least one gate driving voltage line supplying a necessary power to the gate driver 200. In this case, at least two first voltage supply lines PLA and at least two second voltage supply lines SL may be provided on the front surface of the display panel 100. Accordingly, at least two first voltage supply link lines connected to the at least two first voltage supply lines PLA and at least two second voltage supply link lines connected to the at least two second voltage supply lines SL may be provided on the rear surface of the display panel 100.

At least one clock line supplies at least one clock required for the gate driver 200 to the gate driver 200.

Hereinafter, for convenience of description, each of the data lines DL, power supply lines, and clock lines may be referred to as a signal line 190. The signal line 190 may extends to the rear surface of the display panel 100 through the routing line 700 provided in the lateral surface of the display panel 100 and may be connected to the link line 800 provided in the rear surface.

That is, the signal line 190 may be connected to the routing line 700 and the routing line 700 may be connected to the link line 800.

Accordingly, the signal line 190 provided on the front surface of the display panel 100 may be connected to the link line 800 provided on the rear surface of the display panel 100 through the routing line 700 provided on the lateral surface of the display panel 100.

The link line 800 may be connected to any one of the data driver 300, the controller 400, and the power supply 500. That is, some of the link lines 800 may be connected to the data driver 300, some of the link lines 800 may be connected to the controller 400, and some of the link lines 800 may be connected to the power supply 500.

The display panel 100 may include one base substrate. In this case, pixels P, gate lines GL, data lines DL, power supply lines, clock lines, and stages Stage 1 to Stage m may be provided in the front surface of the base substrate. Link lines 800 may be provided in the rear surface of the base substrate. Moreover, a first printed circuit board 301 equipped with a data driver 300 and a second printed circuit board 410 equipped with a controller 400 and a power supply 500 may be provided in the rear surface of the base substrate.

The display panel 100 may be formed by bonding a first panel 110 including a first base substrate and a second panel 120 including a second base substrate. In this case, pixels P, gate lines GL, data lines DL, power supply lines, clock lines, and stages Stage 1 to Stage m may be provided in the first panel 110. Link lines 800 may be provided in the second panel 120, and a first printed circuit board 301 equipped with a data driver 300 and a second printed circuit board 410 equipped with a controller 400 and a power supply 500 may be provided in the second panel 120. The first panel 110 and the second panel 120 may be bonded together by an adhesive 900, and particularly, the first base substrate and the second base substrate may be bonded together by the adhesive 900. In this case, a surface in which the gate lines GL are provided may be referred to as the front surface of the display panel 100, and a surface in which the link lines 800 are provided may be referred to as the rear surface of the display panel 100.

That is, the display panel 100 may include one base substrate, and in this case, the above-described various elements may be provided in the front surface and the rear surface of the base substrate. Moreover, the display panel 100 may be manufactured by bonding the first panel 110 and the second panel 120 which include the above-described various elements.

Hereinafter, for convenience of description, as illustrated in FIGS. 4 and 5, the display panel 100 including the first panel 110 and the second panel 120 will be described as an example of the present disclosure. Accordingly, the following description may be applied to the display panel 100 including one base substrate.

Link lines 800 may be provided on the rear surface of the display panel 100 and the link lines 800 may be connected to the first printed circuit board 301 in a circuit connection unit 302. To this end, link pads 303 connecting the link lines 800 and the first printed circuit board 301 may be provided in the circuit connection unit 302.

The first printed circuit board 301 may be provided with substrate lines connected to the link lines 800 through the circuit connection unit 302. A portion of the substrate lines may be connected to the data driver 300 provided in the first printed circuit board 301.

The other portion of the substrate lines may extend to the second printed circuit board 410 connected to the first printed circuit board 301, and may be connected to the controller 400 or the power supply 500 provided in the second printed circuit board 410.

To provide an additional description, the link lines 800 may be connected to the signal lines 190 through the routing lines 700 provided on the lateral surface of the display panel 100, and the circuit connection unit 302 may be provided in the link lines 800 provided on the rear surface of the display panel 100. The circuit connection unit 302 may be connected to a printed circuit board in which a driver for driving the signal lines 190 and the gate lines GL are mounted. That is, the link lines 800 may be connected to the data driver 300, the controller 400, and the power supply 500 through the circuit connection unit 302. Here, the driver may include at least one of the data driver 300, the controller 400, and the power supply 500, and the printed circuit board in which the driver is mounted may be, for example, the first printed circuit illustrated in FIG. 5.

The test unit 600 may be provided at an end of the link lines 800 extending from the circuit connection unit 302.

As described above, the link lines 800 provided on the rear surface of the display panel 100 may be connect the substrate lines provided in the first printed circuit board 301 through the link pads 303 provided on the rear surface of the display panel 100, and the substrate lines may be connected to the data driver 300, the controller 400, and the power supply 500. Accordingly, the link lines 800 may be connected to the data driver 300, the controller 400 and the power supply 500.

In this case, the link lines 800 provided on the rear surface of the display panel 100 may further extend from the circuit connection unit 302, and the test unit 600 may be provided at ends of the link lines 800 extending from the circuit connection unit 302.

The test unit 600 may be connected to a light emission test device for determining whether light is normally output from the pixels P, and thus, whether light is normally output from the pixels P can be determined.

That is, according to an embodiment of the present disclosure, it can be determined whether light is normally output from the pixels P after the display panel 100 is finally completed so that it can be mounted on a product and sold. Accordingly, it can be determined whether light is normally output from the pixels P at the final step of the manufacturing process, and thus, the defective rate of the final product can be reduced.

To provide an additional description, after the first panel 110 and the second panel 120 are individually manufactured, the first panel 110 and the second panel 120 are bonded by an adhesive 900, and the routing lines 700 are provided in the lateral surface of the first panel 110 and the second panel 120, and then, finally, manufacturing of the display panel 100 is completed.

Even when the display panel 100 includes one base substrate, after stages are provided on a front surface of the base substrate and link lines 800 are provided on a rear surface of the base substrate, routing lines 700 are provided on a lateral surface of the display panel 100, and then, finally, manufacturing of the display panel 100 is completed.

In the related art, it could be determined whether light is normally output from the pixels P after a first panel 110 was manufactured or after data lines were provided on a front surface of a base substrate, and it could not be determined whether light is normally output from the pixels P after routing lines 700 were provided on a lateral surface of a display panel 100.

However, according to the display apparatus according to an embodiment of the present disclosure, even after the routing lines 700 are provided on a lateral surface of the display panel 100, it can be determined whether light is normally output from the pixels P by the test unit 600.

To this end, in the display apparatus according to an embodiment of the present disclosure, the test unit 600 connected to the light emission test device to be used to determine whether light is normally output from the pixels P is provided on the rear surface of the display panel 100.

Therefore, even after the signal lines 190 and the link lines 800 provided in the two bonded panels are connected to each other by the routing lines 700 or the signal lines 190 and the link lines 800 provided on a front surface and a rear surface of one substrate are connected to each other by the routing lines 700, it can be determined whether light is normally output from the pixels P by a light emission test device connected to the test unit 600.

The test unit 600 may include at least two jig units **600*a* provided at ends of the link lines 800**.

Finally, as described above, the link lines 800 may include at least one gate driving voltage line for supplying power necessary for the gate driver 200 to the gate driver 200 and at least one clock line for supplying clocks necessary for the gate driver 200.

In order to determine whether light is normally output from the pixels P using the test unit 600, gate signals GS should be output from the gate driver 200 to the gate lines GL, and to this end, a driving voltage and a clock should be supplied through at least one gate driving voltage line and at least one clock line.

To this end, a gate pad unit 210 may be provided at ends of at least two link lines (hereinafter simply referred to as gate link lines) 211 connected to at least one gate driving voltage line and at least one clock line among the link lines 800.

That is, the gate link lines 211 may also be connected to the first printed circuit board 301 through the link pads 303 provided in the circuit connection unit, and the gate link lines 211 may be connected to the data driver 300 provided in the first printed circuit board 301 or the controller 400 and the power supply 500 provided in the second printed circuit board 410 through the substrate lines provided in the first printed circuit board 301 or the second printed circuit board 410.

Moreover, a gate pad unit 210 may be provided at ends of the gate link lines 211 extending from the circuit connection unit 302.

Gate pads **210*a* connected to the gate link lines 211 may be provided in the gate pad unit 210**.

When whether light is normally output from the pixels P is determined by using the light emission test device, power and clocks to be supplied to the gate driver 200 may be supplied to the gate driver 200 through the gate pad unit 210. To this end, jigs of the light emission test device may be connected to the gate pads **210*a***.

Structures and functions of the test unit 600 and the gate pad unit 210 will be described below in detail with reference to the drawings.

Figure 7:
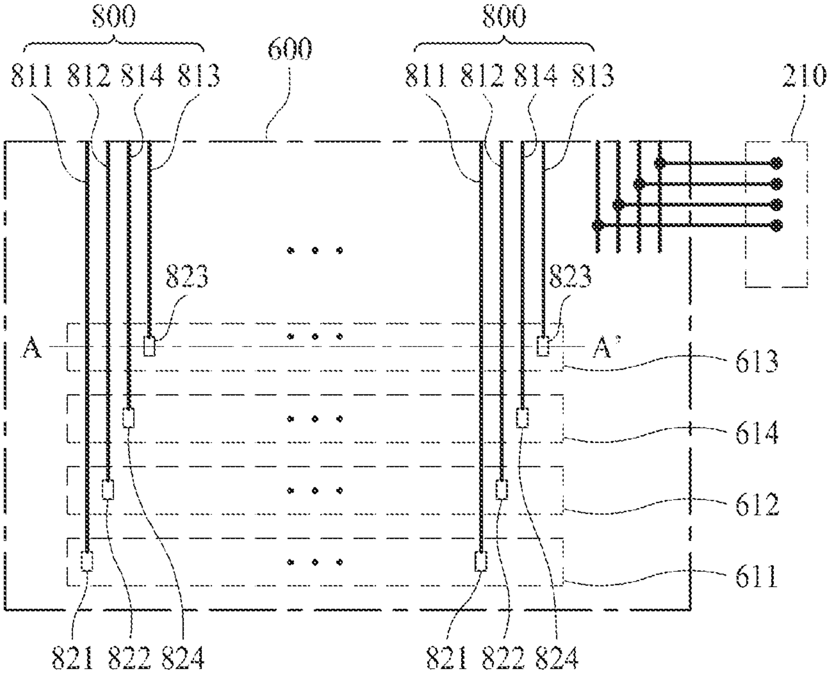
FIG. 7 is an exemplary diagram illustrating a structure of a test unit applied to a display apparatus according to an embodiment of the present disclosure.
Figure 8:
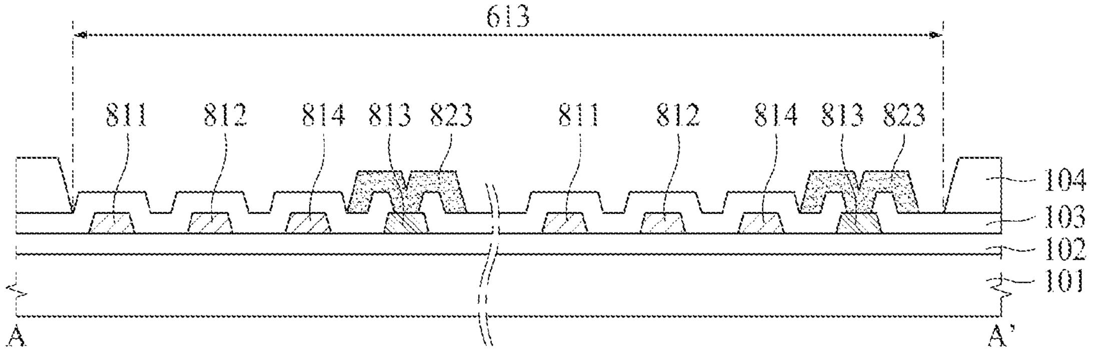
FIG. 8 is an exemplary diagram illustrating a cross-sectional surface taken along line A-A" illustrated in FIG. 7.
Figure 9:
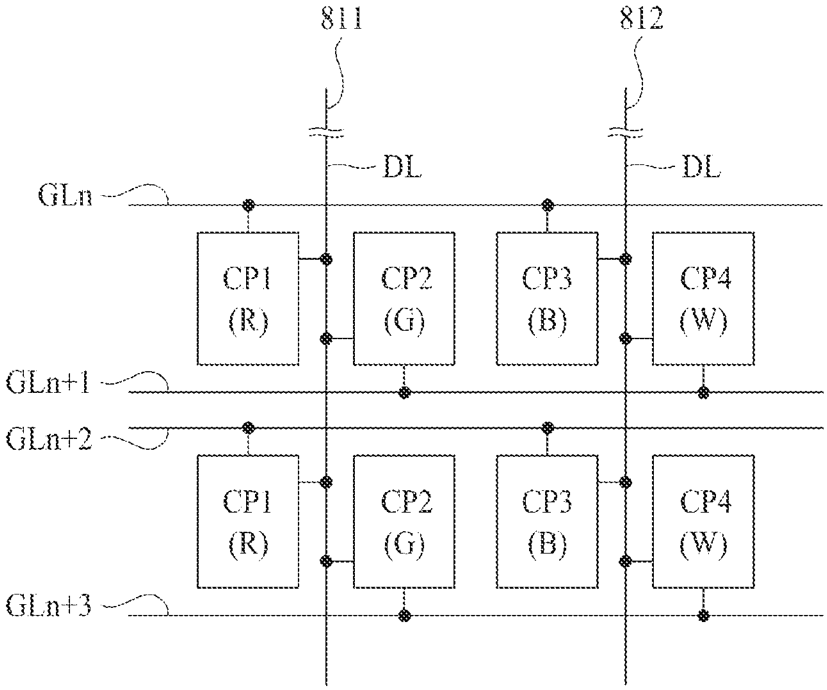
FIG. 9 is an exemplary diagram illustrating a DRD method applied to a display apparatus according to an embodiment of the present disclosure.
Figure 10:
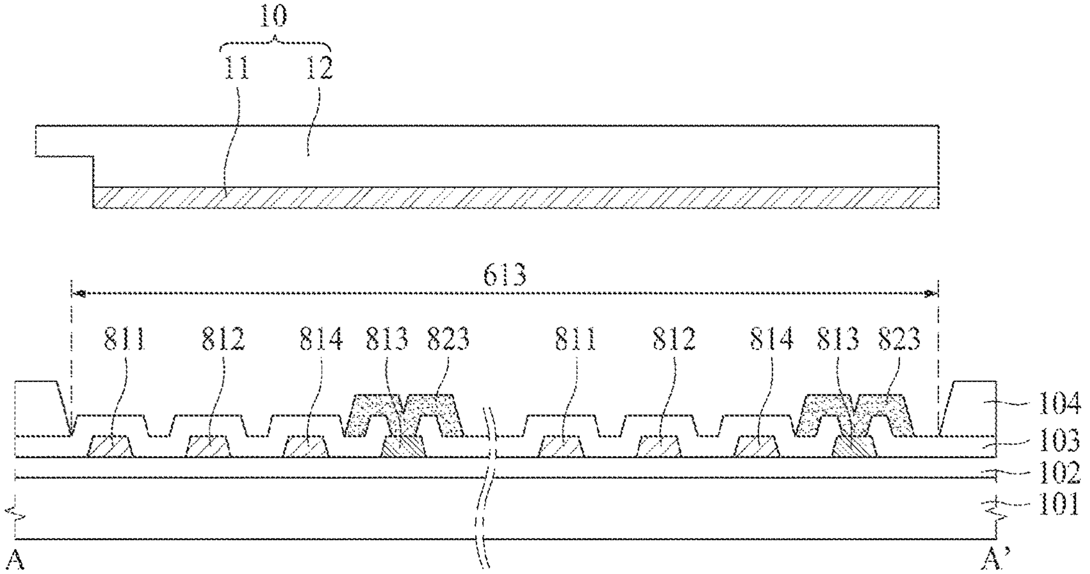
FIG. 10 is an exemplary diagram illustrating a light emission test device provided at an upper end of a jig unit illustrated in FIG. 8.

FIG. 7 is an exemplary diagram illustrating a structure of a test unit applied to a display apparatus according to an embodiment of the present disclosure, FIG. 8 is an exemplary diagram illustrating a cross-sectional surface taken along line A-A" illustrated in FIG. 7, FIG. 9 is an exemplary diagram illustrating a DRD method applied to a display apparatus according to an embodiment of the present disclosure, and FIG. 10 is an exemplary diagram illustrating a light emission test device provided at an upper end of a jig unit illustrated in FIG. 8.

As described above, the test unit 600 may be provided at ends of the link lines 800 extending from the circuit connection unit 302, and gate pad unit 210 may be provided at ends of the gate link lines 211 connected to the gate driver 200 among the link lines 800.

First, ends of the link lines 800 may be exposed in the test unit 600.

For example, as illustrated in FIG. 8, the display panel 100 may include a substrate 101, a first insulating layer 102 provided on the substrate 101, link lines 800 provided on the first insulating layer 102, a second insulating layer 103 covering the link lines 800, main pads 821, 822, 823, and 824 connected to the link line 800 through a contact hole provided in the second insulating layer 103, and a passivation layer 104 surrounding an outer portion of the main pads 821, 822, 823, and 824. That is, the link lines 800 may be covered by the second insulating layer 103, the main pads 821, 822, 823, and 824 may be exposed in the test unit 600, the main pads 821, 822, 823, and 824 may be connected to the link lines 800, and the main pads 821, 822, 823, and 824 may be connected to the link lines 800 through a contact hole provided in the second insulating layer 103.

Here, the cross-sectional surface illustrated in FIG. 8 may be a cross-sectional surface of a second panel 120 forming a rear surface of the display panel 100 among the first panel 110 and the second panel 120 configuring the display panel 100, or may be a cross-sectional surface of a portion forming a rear surface of the display panel 100 formed of one substrate. That is, the cross-sectional surface illustrated in FIG. 8 is illustrated to explain a structure of a rear surface of the display panel 100, and thus, does not illustrate an entire cross-sectional surface of the display panel 100.

As described above, the passivation layer 104 may be provided at an uppermost end of the rear surface of the display panel 100, and the main pads 821, 822, 823, and 824 may not be covered by the passivation layer 104. Accordingly, the main pads 821, 822, 823, and 824 may be exposed to an outside without being covered by the passivation layer 104.

A region in which the main pads 821, 822, 823, and 824 are not covered by the passivation layer 104 is referred to as a jig unit 600*a*.

The test unit 600 includes at least two jig units 600*a*, and at least two main pads may be provided in each of the jig units 600*a*.

A passivation layer 104 may be provided or may not be provided between the jig units 600*a*.

That is, in the test unit 600, ends of the link lines 800 may be exposed to an outside, and particularly, the main pads 821, 822, 823, and 824 connected to the ends of the link lines 800 may be exposed to the outside. In this case, at least two main pads may be exposed to the outside in each of the jig units 600*a* configuring the test unit 600.

As described above, the test unit 600 may include at least two jig units 600*a*. In the following description, when each of the at least two jig units 600*a* is described, a first jig unit 611, a second jig unit 612, a third jig unit 613, a fourth jig unit 614, etc. may be used. That is, a generic name for at least two jig units is referred to by 600*a*, and reference numerals 611, 612, 613, and 614 are used to refer to each of the jig units.

Accordingly, FIG. 7 illustrates the test unit 600 provided with four jig units 600*a*, and FIG. 8 illustrates a cross-sectional surface of a third jig unit 613 among the four jig units 600*a*.

The link lines 800 extending to the test unit 600 may be divided into at least two groups. The test unit 600 may include a first jig unit 611 in which first main pads 821 are connected to link lines (hereinafter simply referred to as first group link lines 811) included in a first group among the at least two groups and a second jig unit 612 in which second main pads 822 are connected to link lines (hereinafter simply referred to as second group link lines 812) included in a second group among the at least two groups.

That is, the link lines 800 extending to the test unit 600 may be divided into at least two groups, and the test unit 600 may include at least two jig units 600*a* corresponding to the at least two groups.

In this case, ends of link lines 800 included in any one of the at least two groups may be exposed in any one of the at least two jig units 600*a*.

That is, the first main pads 821 may be exposed in the first jig unit 611, and the second main pads 822 may be exposed in the second jig unit 612.

As described above, link lines 800 extending to the test unit 600 may be divided into the at least two groups, and the test unit 600 may include at least two jig units 600*a* corresponding to the at least two groups.

The at least two groups may include a first group including the first group link lines 811 supplying data voltage to a first pixel among the pixels P and a second group including the second group link lines 812 supplying data voltage to a second pixel among the pixels P.

That is, among the link lines 800 extending to the test unit 600, the first group link lines 811 are included in the first group, and the second group link lines 812 are included in the second group.

Also, each of the first group link lines 811 may supply a data voltage to the first pixel, and each of the second group link lines 812 may supply a data voltage to the second pixel.

The first pixel connected to the first group link line 811 may include a first color pixel CP1 displaying a first color and a second color pixel CP2 displaying a second color. The second pixel connected to the second group link line 812 may include a third color pixel CP3 displaying a third color and a fourth color pixel CP4 displaying a fourth color.

For example, as illustrated in FIG. 9, a data line DL connected to the first group link line 811 may be connected to a first color pixel CP1 displaying a first color R and a second color pixel CP2 displaying a second color G. That is, the first pixel connected to the first group link line 811 may include a first color pixel CP1 displaying a first color R and a second color pixel CP2 displaying a second color G. In this case, the first color pixel CP1 may be connected to an nth gate line GLn and the second color pixel CP2 may be connected to an n+1th gate line GLn+1. Here, n may be a natural number.

Moreover, a data line DL connected to the second group link line 812 may include a third color pixel CP3 displaying a third color B and a fourth color pixel CP4 displaying a fourth color. That is, a first pixels connected to the second group link line 812 may include a third color pixel CP3 displaying a third color B and a fourth color pixel CP4 displaying a fourth color W. In this case, the third color pixel CP3 may be connected to an nth gate line GLn and the fourth color pixel CP4 may be connected to an n+1 th gate line GLn+1. A display apparatus having such a structure may be driven by a double rate driving (hereinafter simply referred to as DRD) method.

For example, when a data voltage Vdata corresponding to the first color pixel CP1 is be supplied to a data line DL connected to the first group link line 811 and a data voltage Vdata corresponding to the third color pixel CP3 is supplied to a data line DL connected to the second group link line 812, a gate pulse may be supplied to the nth gate line GLn. Accordingly, the data voltages Vdata may be supplied to the first color pixel CP1 and the third color pixel CP3.

When a data voltage Vdata corresponding to the second color pixel CP2 is supplied to a data line DL connected to the first group link line 811 and a data voltage Vdata corresponding to the fourth color pixel CP4 is supplied to a data line DL connected to the second group link line 812, a gate pulse may be supplied to the n+1 th gate line GLn+1. Accordingly, the data voltages Vdata may be supplied to the second color pixel CP2 and the fourth color pixel CP4.

Accordingly, data voltages Vdata may be supplied to the four color pixels CP1, CP2, CP3, and CP4 using the two data lines and the two gate lines.

That is, the number of data lines DL in a display apparatus driven by the DRD method may be reduced to half of the number of data lines DL in a display apparatus driven by a general method in which four data lines are connected to four color pixels.

To provide an additional description, the number of data lines DL included in a display apparatus according to an embodiment of the present disclosure may be smaller than the number of data lines DL included in a display apparatus driven by a general method of the related art.

When the number of data lines DL is reduced, the number of routing lines 700 and link lines 800 may be reduced. Moreover, instead of routing lines 700 and link lines 800 corresponding to the reduced data lines DL, new kind of routing lines 700 and link lines 800 necessary for display panels may be provided.

However, the present disclosure is not limited to a display apparatus driven by a DRD method.

Accordingly, the first pixel connected to the first group link line 811 may include only the first color pixel CP1 displaying the first color and the second pixel connected to the second group link line 812 may include only the second color pixel CP2 displaying the second color. That is, the first group link line 811 may be connected only to the first color pixels CP1 provided along a data line connected to the first group link line 811, and the second group link line 812 may be connected only to the second color pixels CP2 provided along a data line connected to the second group link line 812.

In this case, when the pixels are divided into four colors, the third group link lines 813 connected to the third color pixels and the fourth group link lines 814 connected to the fourth color pixels may be further provided in the test unit 600. That is, the link lines may be divided into four groups, and in this case, the test unit 600 may include four jig units corresponding to the four groups.

As described above, the link lines 800 extending to the test unit 600 may be divided into at least two groups, and the test unit 600 may include at least two jig units 600*a* corresponding to the at least two groups.

As described above, the at least two groups may include the first group including the first group link lines 811 supplying data voltage to the first pixel among the pixels P and a second group including the second group link lines 812 supplying data voltage to the second pixel among the pixels P.

In this case, the at least two groups may further include a pixel driving voltage line group including link lines supplying pixel driving voltages to the pixel driving circuits PDC included in the pixels.

Link lines supplying pixel driving voltages may include, for example, a link line connected to a first voltage supply line PLA supplying a first voltage VDD to a light emitting device ED and a link line connected to a second voltage supply line SL supplying a second voltage Vref to a pixel driving circuit PDC.

Therefore, link lines supplying the pixel driving voltages may be divided into a third group including third group link lines 813 connected to the first voltage supply lines PLA and a fourth group including fourth group link lines 814 connected to the second voltage supply lines SL.

In this case, link lines 800 extending to the test unit 600 may be divided into, as illustrated in FIG. 7, a first group including first group link lines 811 supplying a data voltage to a first pixel among the pixels P, a second group including second group link lines 812 supplying data voltage to a second pixel among the pixels P, a third group including third group link lines 813 connected to the first voltage supply lines PLA, and a fourth group including fourth group link lines 814 connected to the second voltage supply lines SL.

However, link lines supplying pixel driving voltages may be divided into only one of the third group and the fourth group, and in this case, the link lines 800 extending to the test unit 600 may be divided into a first group, a second group, and a third group, or into a first group, a second group, and a fourth group.

Also, when more types of pixel driving voltages are added, link lines supplying pixel driving voltages may be divided into at least three groups. Moreover, as described above, the groups of link lines supplying data voltages may be divided into two or four groups. Moreover, as the types of pixels become various, the groups of link lines may be divided into three groups, or five or more groups.

That is, the number of groups of link lines may be variously changed.

As described above, link lines may be divided into at least two groups.

Hereinafter, for convenience of description, as illustrated in FIG. 7, a display apparatus in which link lines 800 are divided into four groups will be described as an example of the present disclosure.

That is, link lines 800 may be divided into four groups, and in this case, the test unit 600 may include a first jig unit 611, a second jig unit 612, a third jig unit 613, and a fourth jig unit 614.

First main pads 821 connected to the first group link lines 811 included in the first group among the four groups may be provided in the first jig unit 611, second main pads 822 connected to the second group link lines 812 included in the second group among the four groups may be provided in the second jig unit 612, third main pads 823 connected to the third group link lines 813 included in the third group among the four groups may be provided in the third jig unit 613, and fourth main pads 824 connected to the fourth group link lines 814 included in the fourth group among the four groups may be provided in the fourth jig unit 614.

In this case, as described with reference to FIG. 9, each of the first group link lines 811 may be connected to a data line connected to a first pixel among the pixels P, and each of the second group link lines 812 may be connected to a data line connected to a second pixel among the pixels P. The first pixel connected to the first group link line 811 may include a first color pixel CP1 displaying a first color and a second color pixel CP2 displaying a second color. The second pixel connected to the second group link line 812 may include a third color pixel CP3 displaying a third color and a fourth color pixel CP4 displaying a fourth color.

Moreover, each of the third group link lines 813 may be connected to a first voltage supply line PLA provided in the pixels P, and each of the fourth group link lines 814 may be connected to a second voltage supply line SL provided in the pixels P.

In this case, ends of the first group link lines 811 may be exposed in the first jig unit 611, and particularly, first main pads 821 connected to the first group link lines 811 may be exposed in the first jig unit 611. Ends of the second group link lines 812 may be exposed in the second jig unit 612, and particularly, second main pads 822 connected to the second group link lines 812 may be exposed in the second jig unit 612. Ends of the third group link lines 813 may be exposed in the third jig unit 613, and particularly, third main pads 823 connected to the third group link lines 813 may be exposed in the third jig unit 613. Ends of the fourth group link lines 814 may be exposed in the fourth jig unit 614, and particularly, fourth main pads 824 connected to the fourth group link lines 814 may be exposed in the fourth jig unit 614.

That is, in each of the first jig unit 611 to the fourth jig unit 614, regions where the main pads are provided and regions between the main pads may not be covered by the passivation layer 104.

In this case, the passivation layer 104 may not be provided or may be provided between the first jig unit 611 to the fourth jig unit 614.

Finally, FIG. 10 illustrates a jig 10 of a light emission test device provided at an upper end of a third jig unit 613 illustrated in FIG. 8.

The jig 10 may include a metal layer 11 in contact with the third main pads 823 and a support unit 12 supporting the metal layer 11.

As described above, in the third jig unit 613, the region where the third main pads 823 are provided and the regions between the third main pads 823 may not be covered by the passivation layer 104 and exposed to the outside.

Accordingly, the metal layer 11 may contact the third main pads 823, and thus, signals for light emission test may be supplied to the third main pads 823.

The main pads provided in each of the rest of the jig units may also be in contact with the jigs 10, and accordingly, signals for light emission test may be supplied to the rest of the jig units.

Moreover, jigs for the light emission test may be also in contact with each of the gate pads 210*a* in the gate pad unit 210.

Accordingly, signals for the light emission test may be supplied to the data line DL, the first voltage supply line PLA, the second voltage supply line SL, and the gate driver 200, and light may be emitted in the pixels P by the signals for the light emission test.

In this case, pixels in which light is not emitted or light is poorly emitted may be identified, and accordingly, whether the display panel is defective may be determined, and whether a repair process for the display panel should be performed may also be determined.

That is, according to the display apparatus according to an embodiment of the present disclosure as described above, even after the routing line 700 is provided in the display panel 100, the light emission test using the test unit 600 may be performed. Therefore, sales or shipment of the defective display panel 100 may be reduced, and a yield rate of display panels may be enhanced through a repair process for the defective display panels.

When the light emission test is finished, the jig units 611, 612, 613, and 614 in which the main pads 821, 822, 823, and 824 are exposed to the outside may be filled with an insulating material or covered by an insulating tape.

Figure 11:
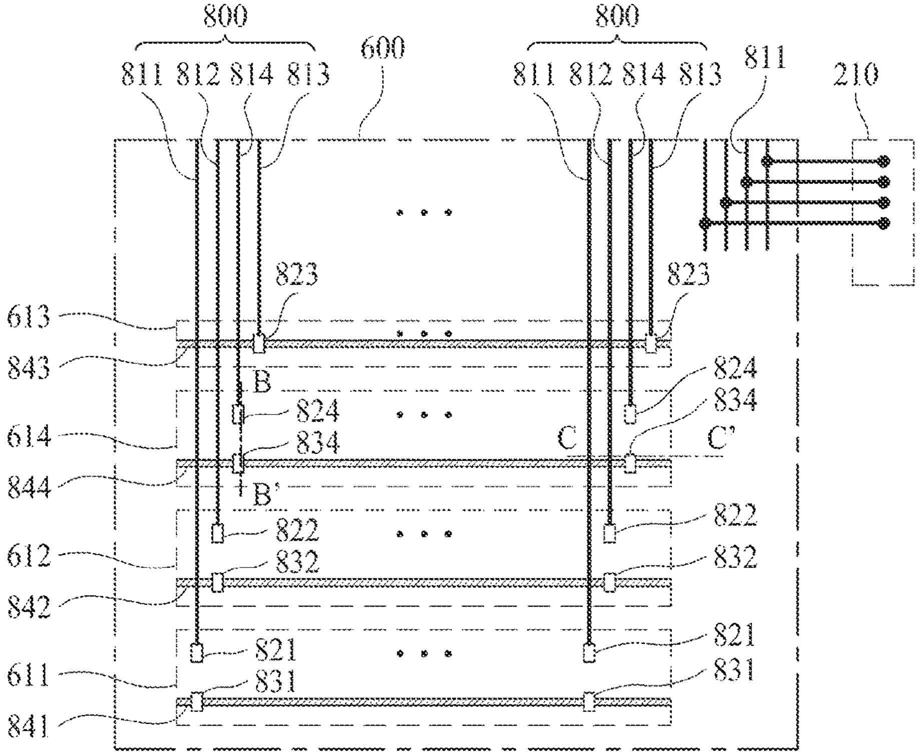
FIG. 11 is an exemplary diagram illustrating another structure of a test unit applied to a display apparatus according to an embodiment of the present disclosure.
Figure 12:
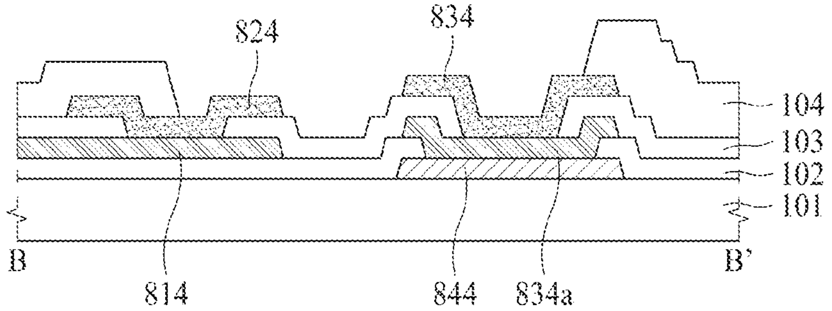
FIG. 12 is an exemplary diagram illustrating a cross-sectional surface taken along line B-B" illustrated in FIG. 11.
Figure 13:
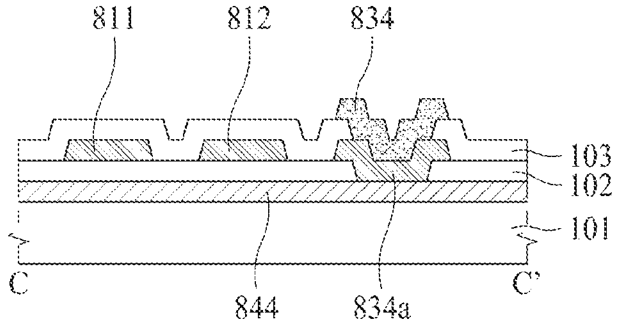
FIG. 13 is an exemplary diagram illustrating a cross-sectional surface taken along line C-C" illustrated in FIG. 11.
Figure 14:
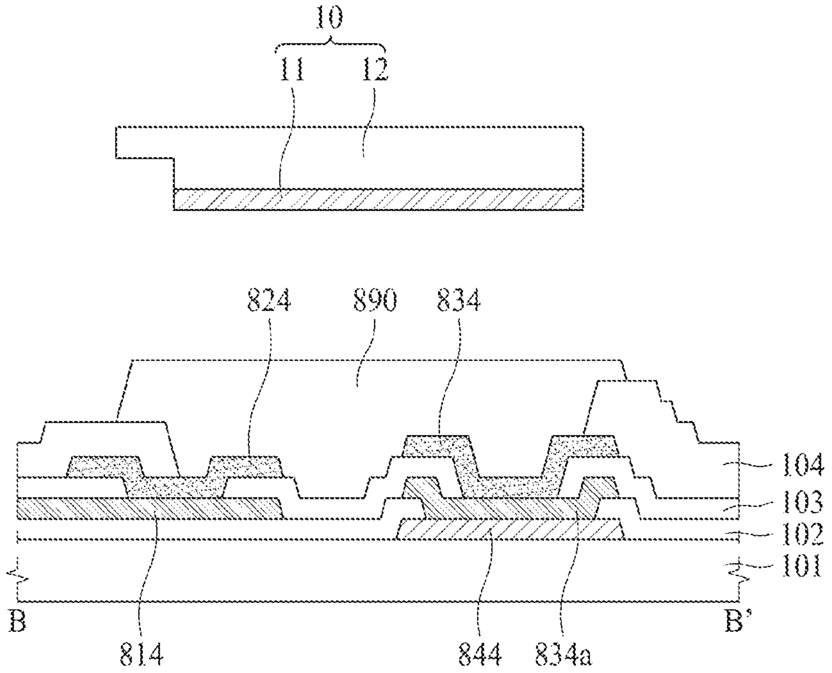
FIG. 14 is an exemplary diagram illustrating a light emission test device provided at an upper end of a jig unit illustrated in FIG. 12.

FIG. 11 is an exemplary diagram illustrating another structure of a test unit applied to a display apparatus according to an embodiment of the present disclosure, FIG. 12 is an exemplary diagram illustrating a cross-sectional surface taken along line B-B' illustrated in FIG. 11, FIG. 13 is an exemplary diagram illustrating a cross-sectional surface taken along line C-C" illustrated in FIG. 11, and FIG. 14 is an exemplary diagram illustrating a light emission test device provided at an upper end of a jig unit illustrated in FIG. 12. In the following description, details which are the same or similar to details described above are omitted or will be briefly described.

As described above, the test unit 600 may be provided at ends of the link lines 800 extending from the circuit connection unit 302, and a gate pad unit 210 may be provided at ends of the gate link lines 211 connected to the gate driver 200 among the link lines 800.

First, among the descriptions described with reference to FIGS. 7 to 10, descriptions applied to the embodiments illustrated in FIGS. 11 to 14 are briefly summarized as follows.

That is, ends of the link lines 800 may be exposed in the test unit 600, and particularly, the main pads 821, 822, 823, and 824 connected to the link lines 800 may be exposed in the test unit 600.

Moreover, the test unit 600 illustrated in FIGS. 11 to 14 may be provided with secondary pads 831, 832, and 834, and the secondary pads 831, 832, and 834 may be also exposed.

That is, the main pads 821, 822, 823, and 824 and secondary pads 831, 832, 834 in the jig units 611, 612, 613, and 614 provided in the test unit 600 may not be covered by the passivation layer 104 and may be exposed to the outside.

The link lines 800 extending to the test unit 600 may be divided into at least two groups. The test unit 600 may include a first jig unit 611 in which first main pads 821 are connected to link lines (hereinafter simply referred to as first group link lines 811) included in a first group among the at least two groups and a second jig unit 612 in which second main pads 822 are connected to link lines (hereinafter simply referred to as second group link lines 812) included in a second group among the at least two groups.

The first pixel connected to the first group link line 811 may include a first color pixel CP1 displaying a first color and a second color pixel CP2 displaying a second color. The second pixel connected to the second group link line 812 may include a third color pixel CP3 displaying a third color and a fourth color pixel CP4 displaying a fourth color.

However, the first pixel connected to the first group link line 811 may include only the first color pixel CP1 displaying the first color and the second pixel connected to the second group link line 812 may include only the second color pixel CP2 displaying the second color.

The at least two groups may further include a pixel driving voltage line group including link lines supplying pixel driving voltages to the pixel driving circuits PDC included in the pixels. At least one group may be included in the pixel driving voltage line group.

For example, link lines supplying the pixel driving voltages may be divided into a third group including third group link lines 813 connected to the first voltage supply lines PLA and a fourth group including fourth group link lines 814 connected to the second voltage supply lines SL.

In this case, link lines 800 extending to the test unit 600 may be divided into a first group including first group link lines 811 supplying a data voltage to a first pixel among the pixels P, a second group including second group link lines 812 supplying data voltage to a second pixel among the pixels P, a third group including third group link lines 813 connected to the first voltage supply lines PLA, and a fourth group including fourth group link lines 814 connected to the second voltage supply lines SL.

As described above, the link lines 800 may be divided into at least two groups, and the test unit 600 may include at least two jig units corresponding to the at least two groups.

In this case, in the first jig unit 611 of the at least two jig units, first main pads 821 connected to the first group link lines 811 included in the first group of the at least two groups, first secondary pads 831 apart from the first main pads 821, and first connection line 841 connected to the first secondary pads 831 may be provided.

In the second jig unit 612 of the at least two jig units, second main pads 822 connected to the second group link lines 812 included in the second group of the at least two groups, second secondary pads 832 apart from the second main pads 822, and second connection line 842 connected to the second secondary pads 832 may be provided.

That is, the first connection line 841 may connect the first secondary pads 831 corresponding to the first group link lines 811, and the second connection line 842 may connect the second secondary pads 832 corresponding to the second group link lines 812.

When the test unit 600 includes three or more jig units, each of the three or more jig units may have a structure as described above.

For example, when the test unit 600 includes four jig units 611, 612, 613, and 614 as illustrated in FIG. 11, the fourth jig unit 614 may also include, as illustrated in FIGS. 11 and 12, fourth main pads 824 connected to the fourth group link lines 814, fourth secondary pads 834 apart from the fourth main pads 824, and fourth connection line 844 connected to the fourth secondary pads 834.

In this case, as illustrated in FIG. 12, the fourth connection line 844 may be provided on an upper end of a substrate 101, the fourth connection line 844 may be covered by a first insulating layer 102, fourth group link lines 814 provided on the first insulating layer 102 may be covered by a second insulating layer 103, fourth group link line 814 and fourth main pad 824 may be connected to each other through contact hole provided in the second insulating layer 103, the fourth secondary pads 834 may be provided on the second insulating layer 103, and the fourth secondary pad 834 and the fourth connection line 844 may be connected to each other through another contact hole provided in the first insulating layer 102 and the second insulating layer 103. In this case, a fourth secondary connection pad 834*a* may be further provided between the fourth secondary pad 834 and the fourth connection line 844.

The fourth secondary connection pad 834*a* may be connected to the fourth connection line 844 through a contact hole provided in the first insulating layer 102, and the fourth secondary pad 834 may be connected to the fourth secondary connection pad 834*a* through a contact hole provided in the second insulating layer 103. Accordingly, the fourth secondary pad 834 may be connected to the fourth connection line 844.

The first connection line 841, the second connection line 842, and a third connection line may also be connected to the first secondary pad 831, the second secondary pad 832, and a third secondary pad by the same structure as that illustrated in FIG. 12. That is, all jig units may have the same structure.

However, all jig units provided in the test unit 600 do not necessarily have the same structure.

For example, among the four jig units 611, 612, 613, and 614 illustrated in FIG. 11, the third jig unit 613 may have a different structure from the other jig units 611, 612, and 614. Pieces of information related to this will be described below.

As described above, in the first jig unit 611, the first main pads 821 connected to the first group link lines 811, the first secondary pads 831 apart from the first main pads 821, and the first connection line 841 connected to the first secondary pads 831 may be provided. Also, in the second jig unit 612, the second main pads 822 connected to the second group link lines 812, the second secondary pads 832 apart from the second main pads 822, and the second connection line 842 connected to the second secondary pads 832 may be provided.

In this case, the second connection line 842 may overlap the first group link lines 811.

When the fourth jig unit 614 has the same structure as the first jig unit 611 and the second jig unit 612, fourth main pads 824 connected to the fourth group link lines 814, fourth secondary pads 834 apart from the fourth main pads 824, and a fourth connection line 844 connected to the fourth secondary pads 834 may be provided in the fourth jig unit 614. Moreover, in this case, the fourth connection line 844 may overlap the first group link lines 811 and the second group link lines 812.

For example, as illustrated in FIG. 13, the fourth connection line 844 may be provided on an upper end of a substrate 101, and the fourth connection line 844 may be covered by a first insulating layer 102. A first group link line 811, a second group link line 812, and a fourth group link line 814 may be provided on the first insulating layer 102. The first group link line 811, the second group link line 812, and the fourth group link line 814 may be covered by a second insulating layer 103. A fourth secondary pad 834 provided on an upper end of the second insulating layer 103 may be connected to the fourth connection line 844 through contact holes provided in the first insulating layer 102 and the second insulating layer 103. In this case, the fourth secondary pad 834 and the fourth connection line 844 may be connected through the fourth secondary connection pad 834*a*.

That is, the fourth connection line 844 may be provided on an upper end of the substrate 101, and the first group link lines 811 and the second group link lines 812 may be provided on an upper end of the first insulating layer 102 covering the fourth connection line 844, and thus, the fourth connection line 844 may overlap the first group link lines 811 and the second group link lines 812.

Accordingly, when the second jig unit 612 has the same structure as the fourth jig unit 614, the second connection line 842 provided in the second jig unit 612 may overlap the first group link lines 811.

As described above, all jig units included in the test unit 600 may have the same structure, but at least one of the jig units included in the test unit 600 may have a different structure.

For example, link lines 800 may be divided into at least three groups, and the test unit 600 may include at least three jig units corresponding to the at least three groups.

The first jig unit 611, the second jig unit 612, and the third jig unit 613 of the at least three jig units may correspond to a first group, a second group, and a third group of the at least three groups.

In each of the first jig unit 611 and the second jig unit 612, main pads 821 and 822 connected to link lines 800, secondary pads 831 and 832 apart from the main pads 821 and 822, and connection lines 841 and 842 connected to the secondary pads 831 and 832 may be provided.

That is, the first jig unit 611 may be provided with the first main pads 821, the first secondary pads 831, and the first connection line 841, and the second jig unit 612 may be provided with the second main pads 822, the second secondary pads 832, and the second connection line 842.

However, in the third jig unit 613, third main pads 823 connected to the third group link lines 813 and the third connection line connected to the third main pads 823 may be provided.

For example, as described with reference to FIGS. 1 to 3, the display apparatus according to an embodiment of the present disclosure may be driven by an internal compensation method or an external compensation method.

When the internal compensation method is applied, the same voltages may be supplied to the same power supply lines provided in all pixels P. That is, the first voltages VDD supplied to all pixels P may be the same, and the second voltages Vref supplied to all pixels P may also be the same.

However, when the external compensation method is applied, at least one of the voltages (VDD, Vref, etc.) supplied to the pixel P may be different for each pixel. For example, the first voltages VDD of the same level may be supplied to all pixels P, and the second voltages Vref supplied to the pixels P may be different from each other. Also, in a display apparatus to which the internal compensation method is applied, at least one of the voltages (VDD, Vref, etc.) supplied to the pixel P may be different for each pixel depending on the case.

Hereinafter, for convenience of description, a display apparatus in which at least one of jig units provided in the test unit 600 has a different structure will be described with reference to a display apparatus illustrated in FIG. 11 in which the link lines 800 are divided into four groups.

That is, link lines 800 may be divided into four groups, and in this case, the test unit 600 may include a first jig unit 611 provided with first main pads 821 connected to the first group link lines 811 included in a first group among the four group, a second jig unit 612 provided with second main pads 822 connected to the second group link lines 812 included in a second group among the four group, a third jig unit 613 provided with third main pads 823 connected to the third group link lines 813 included in a third group among the four group, and a fourth jig unit 614 provided with fourth main pads 824 connected to the fourth group link lines 814 included in a fourth group among the four group.

In this case, as described with reference to FIG. 9, each of the first group link lines 811 may be connected to a data line connected to a first pixel among pixels P, and each of the second group link lines 812 may be connected to a data line connected to a second pixel among the pixels P.

Moreover, each of the third group link lines 813 may be connected to the first voltage supply line PLA provided in the pixels P, and each of the fourth group link lines 814 may be connected to the second voltage supply line SL provided in the pixels P.

The first voltage VDD may be supplied to the first voltage supply line PLA, and the second voltage Vref may be supplied to the second voltage supply line SL. In this case, the first voltages VDD of the same level may be supplied to all pixels, and the levels of the second voltages Vref supplied to the pixels P may be different from each other.

That is, the levels of the first voltages VDD supplied to all the first voltage supply lines PLA may be the same, and the levels of the second voltages Vref supplied to the second voltage supply lines SL may be different from each other.

Because the levels of the second voltages Vref supplied to the second voltage supply lines SL are different from each other, the characteristics of the fourth group link lines 814 connected to the second voltage supply lines SL may be the same as the characteristics of the first group link lines 811 and the second group link lines 812.

That is, because different data voltages Vdata are supplied to the data lines DL connected to the first group link lines 811 and the second group link lines 812, the characteristics of the fourth group link lines 814 connected to the second voltage supply lines SL to which different second voltages Vref are supplied may be the same as the characteristics of the first group link lines 811 and the second group link lines 812.

Therefore, the structure and characteristics of the fourth jig unit 614 connected to the fourth group link lines 814 may be the same as those of the first jig unit 611 and the second jig unit 612.

Therefore, hereinafter, the reason that the third jig unit 613 has a different structure from the first jig unit 611, the second jig unit 612, and the fourth jig unit 614 will be described.

As described above, the first jig unit 611 may be provided with the first main pad 821, the first secondary pads 831, and the first connection line 841, the second jig unit 612 may be provided with the second main pads 822, the second secondary pads 832, and the second connection line 842, and the fourth jig unit 614 may be provided with the fourth main pads 824, the fourth secondary pads 834, and the fourth connection line 844. That is, a main pad, a secondary pad, and a connection line may be provided in each of the first jig unit 611, the second jig unit 612, and the fourth jig unit 614.

However, in the third jig unit 613, third main pads 823 connected to the third group link lines 813 and a third connection line 843 connected to the third main pads 823 may be provided.

That is, secondary pad may not be provided in the third jig unit 613, and thus, all third group link lines 813 may be connected to the third connection line 843 through the third main pads 823.

The reason that there is no secondary pad apart from the third main pad 823 in the third jig unit 613 is, as described above, even when same voltages are supplied to all the third group link lines 813, the device can operate normally.

For example, it can be determined whether light is normally output from the pixels P by the light emission test device in a state where the third group link lines 813 are connected to the third connection line 843. After the test is performed through the light emission test device, in a state where the third group link lines 813 are connected to the third connection line 843, the display panel may be mounted on a display apparatus or an electronic device and driven.

In this case, the third group link lines 813 may be connected to the power supply 500 through the circuit connection unit 302, and the first voltage VDD may be supplied from the power supply 500 to the first voltage supply lines PLA through the third group link lines 813.

In this case, because first voltages VDD of the same level are supplied to all first voltage supply lines PLA, even when the third group link lines 813 are commonly connected to the third connection line 843, the display apparatus can be normally driven.

Accordingly, as illustrated in FIG. 11, the third group link lines 813 may be commonly connected to the third connection line 843 through the third main pads 823.

However, different second voltages Vref should be supplied to the second voltage supply lines SL connected to the fourth group link lines 814. Therefore, the fourth group link lines 814 should not be connected to the fourth connection line 844 in common. For example, when the display panel 100 is mounted and used in a display apparatus or an electronic device in a state where the fourth group link lines 814 are commonly connected to the fourth connection line 844, different voltages may not be supplied to the second voltage supply lines SL even when different voltage are supplied from the power supply unit 500 to the fourth group link lines 814. Therefore, the display apparatus or an electronic device may not be normally driven.

To provide an additional description, in a display apparatus to which an external compensation method or an internal compensation method is applied, when the first voltages VDD of the same level are supplied to the first voltage supply line PLA and the second voltages Vref of different levels are supplied to the second voltage supply line SL, the structure of the third jig unit 613 connected to the first voltage supply line PLA may be different from the structure of the first jig unit 611, the second jig unit 612, and the fourth jig unit 614.

Moreover, in a display apparatus to which an external compensation method or an internal compensation method is applied, when the first voltages VDD of the same level are supplied to the first voltage supply line PLA and the second voltages Vref of the same level are supplied to the second voltage supply line SL, the structure of the third jig unit 613 connected to the first voltage supply line PLA and the forth jig unit 614 connected to the second voltage supply line SL may be different from the structure of the first jig unit 611 and the second jig unit 612.

Finally, FIG. 14 is an exemplary diagram illustrating a jig 10 of a light emission test device provided at an upper end of a fourth jig unit 614 illustrated in FIG. 12.

The jig 10 may include a metal layer 11 in contact with the fourth main pads 824 and the fourth secondary pads 834, and a support unit 12 supporting the metal layer 11.

As described above, the main pads 821, 822, 823, and 824 and secondary pads 831, 832, and 834 in the jig units 611, 612, 613, 614 provided in the test unit 600 may not be covered by the passivation layer 104 and may be exposed to the outside.

After the display panel 100 having the structure as described above is manufactured, and before a test is performed by the light emission test device, a conductor 890 as illustrated in FIG. 14, for example, metal such as silver Ag may be provided in each of the first jig unit 611 to the fourth jig unit 614 in which the main pads 821, 822, 823, and 824 and the secondary pads 831, 832, and 834 are exposed.

For example, in the fourth jig unit 614, a region in which the fourth main pads 824 and the fourth secondary pads 834 are provided and a region between the fourth main pads 824 and the fourth secondary pads 834 may not be covered by the passivation layer 104 and may be exposed to the outside. Before the light emission test is performed, a conductor 890 may be provided in the fourth jig unit 614 as illustrated in FIG. 14.

Therefore, the metal layer 11 may contact the fourth main pads 824 and the fourth secondary pads 834 through the conductor 890, and thus, signals for the light emission test may supplied to the second voltage supply lines SL through the fourth connection line 844, the fourth secondary pads 834, the fourth main pads 824, and the fourth group link lines 814 from the jig 10.

Main pads and secondary pads provided in each of the other jig units may also contact jigs 10, and thus, signals for the light emission test may be supplied to each of the other jig units. However, because there is no secondary pad to be connected to the third main pad 823 in the third jig unit 613, conductor 890 may not be provided in the third jig unit 613.

Moreover, jigs for the light emission test may be in contact with each of the gate pads 210*a* provided in the gate pad unit 210.

Accordingly, signals for light emission test may be supplied to the data line DL, the first voltage supply line PLA, the second voltage supply line SL, and the gate driver 200, and light may be emitted in the pixels P by the signals for light emission test.

In this case, pixels in which light is not emitted or light is poorly emitted may be identified, and accordingly, whether the display panel is defective may be determined, and whether a repair process for the display panel should be performed may also be determined.

That is, according to the display apparatus according to an embodiment of the present disclosure as described above, even after the routing line 700 is provided in the display panel 100, the light emission test using the test unit 600 may be performed. Therefore, sales or shipment of the defective display panel 100 may be reduced, and a yield rate of display panels may be enhanced through a repair process for the defective display panels.

When the light emission test is finished, the conductor 890 provided in each of the jig units may be removed, and thus, the main pads 821, 822, and 824 and the secondary pads 831, 832, and 834 can be separated from each other. Moreover, the jig units 611, 612, 613, and 614 in which the main pads 821, 822, 823 and 824, and the secondary pads 831, 832, and 834 are exposed to the outside may be filled with an insulating material or covered by an insulating tape.

However, after the light emission test using the light emission test device is finished, each of the first to fourth group link lines 811 to 814 may be separated from each other through laser cutting. That is, after the light emission test is finished, the test unit 600 is not connected to the link lines 800, and the display panel according to the present disclosure may be used by being mounted on a display apparatus or an electronic device in a state where the test unit 600 is not connected to the link lines 800.

As described above, after the light emission test is finished, when the test unit 600 is not connected to the link lines 800 by removing the conductor 890 or separating the first to fourth group link lines 811 to 814 from each other through laser cutting, even when signals are input to the test unit 600, particularly, to the first to fourth connection lines 841, 842, 843, and 844, the signals are not transferred to the signal lines 190 through the link lines 800. Accordingly, a display apparatus or an electronic device in which the display panel is mounted can be normally driven.

Moreover, in the embodiments described with reference to FIGS. 11 to 14, the test may be possible even when the jig 10 contacts only one portion of the third connection line, and the test may be possible even when the jig 10 contacts only one portion of the conductor 890.

For example, even when a metal layer 11 of a first jig contacts only one region of the conductor 890 provided in the first jig unit 611, the first connection line 841 and the first jig may be electrically connected. Accordingly, a signal for a light emission test may be supplied to the first group link line 811 connected to the first connection line 841 through the conductor 890, and thus, the light emission test may be performed. The same effect can be expected from the second jig unit 612 and the fourth jig unit 614. Moreover, even when a metal layer 11 of a third jig contacts only one region of the third connection line 843, a signal for a light emission test may be supplied to the third group link line 813 connected to the third connection line 843, and thus, the light emission test can be performed.

Accordingly, the light emission test for the display panel according to the embodiment described with reference to FIGS. 11 to 14 can be quickly and conveniently performed.

Figure 15:
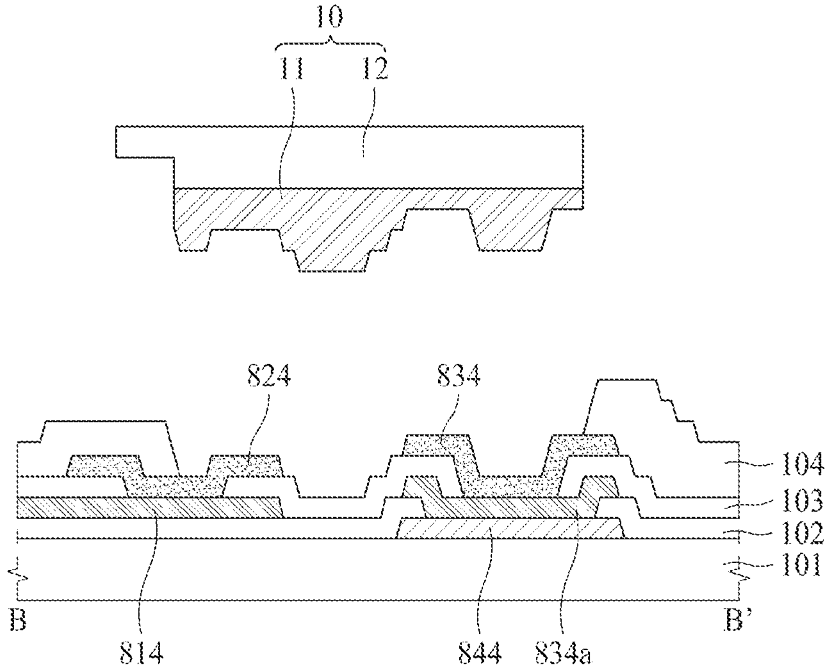
FIG. 15 is another exemplary diagram illustrating a light emission test device provided on an upper end of a jig unit illustrated in FIG. 12.

FIG. 15 is another exemplary diagram illustrating a light emission test device provided on an upper end of a jig unit illustrated in FIG. 12. The structure and function of a display panel 100 illustrated in FIG. 15 are the same as those of a display panel 100 described with reference to FIGS. 11 to 13. Therefore, a detailed description thereof is omitted.

However, unlike the display panel illustrated in FIG. 14, a conductor is not provided in the display panel illustrated in FIG. 15.

That is, when a light emission test is performed for the display panel illustrated in FIGS. 11 to 13, a conductor 890 may be provided in the test unit, as illustrated in FIG. 14.

However, when a light emission test is performed for the display panels illustrated in FIGS. 11 to 13, a conductor may not be provided in the test unit, as illustrated in FIG. 15.

In this case, instead of the conductor being provided in the test unit, a surface shape of the metal layer 11 configuring the jig 10 may be formed to match a surface shape of the jig unit.

Therefore, the metal layer 11 may be closely adhere to the surface of the jig unit, and thus, test signals may be supplied to the link lines and signal lines through the metal layer and the jig unit.

To this end, the surface shape of the metal layer 11 may be molded to match the surface shape of the jig unit, or the metal layer 11 may be formed of a conductor made of a soft material so as to be deformed according to the surface shape of the jig unit.

Accordingly, the metal layer 11 may be closely adhere to the fourth main pads 824 and the fourth secondary pads 834, and thus, signals for a light emission test may be supplied to the second voltage supply lines SL through the fourth connection lines 844, the fourth secondary pads 834, the fourth main pads 824, and the fourth group link line 814 from the jig 10.

Main pads and secondary pads provided in each of the other jig units may also contact metal layers 11, and thus, signals for light emission test may be supplied to each of the other jig units.

Moreover, jigs for the light emission test may be also in contact with each of the gate pads 210*a* in the gate pad unit 210.

Accordingly, signals for the light emission test may be supplied to the data line DL, the first voltage supply line PLA, the second voltage supply line SL, and the gate driver 200, and light may be emitted in the pixels P by the signals for the light emission test.

In this case, because a conductor 890 as illustrated in FIG. 14 is not provided in each of the jig units, after the light emission test is finished, the process of removing the conductor 890 provided in each of the jig units can be omitted.

However, the jig units 611, 612, 613, and 614 in which the main pads 821, 822, 823 and 824, and the secondary pads 831, 832, and 834 are exposed to the outside may be filled with an insulating material or covered by an insulating tape.

Figure 16:
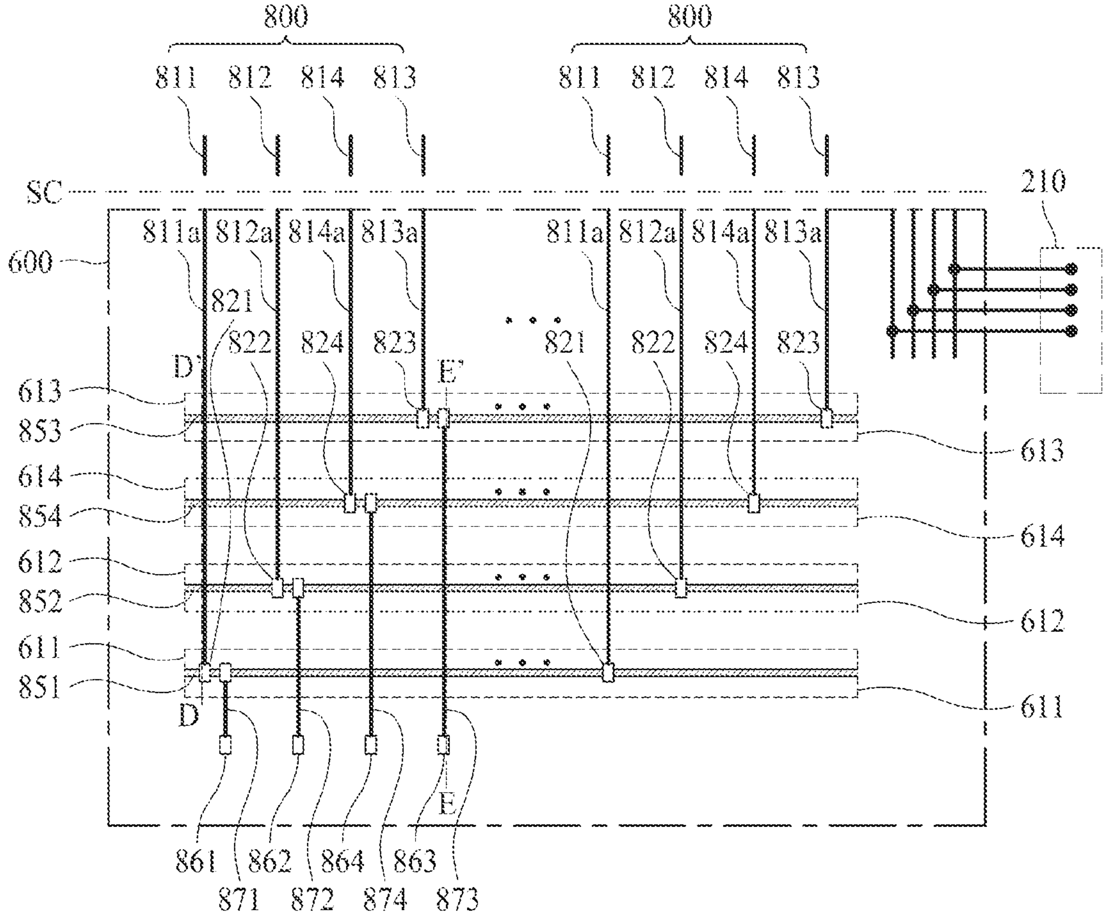
FIG. 16 is an exemplary diagram illustrating another structure of a test unit applied to a display apparatus according to an embodiment of the present disclosure.
Figure 17:
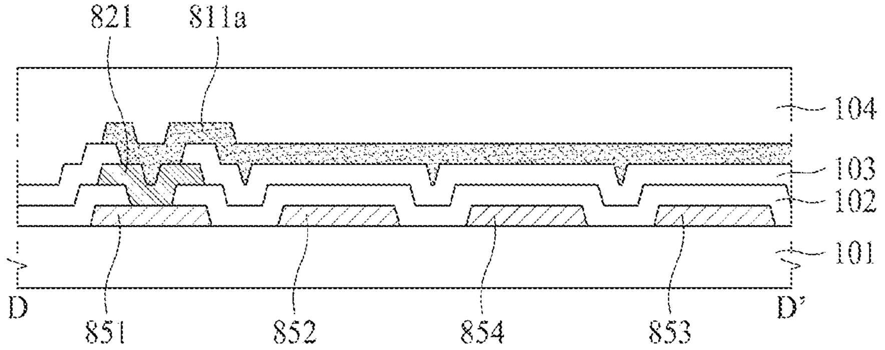
FIG. 17 is an exemplary diagram illustrating a cross-sectional surface taken along line D-D' illustrated in FIG. 16.
Figure 18:
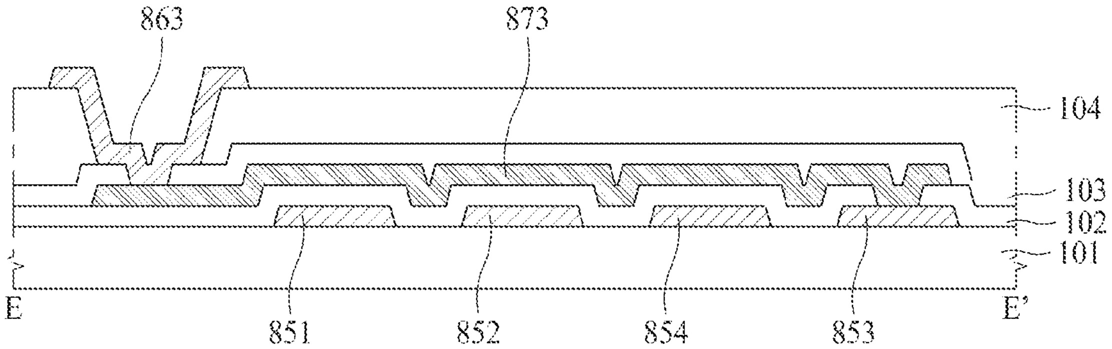
FIG. 18 is an exemplary diagram illustrating a cross-sectional surface taken along line E-E' illustrated in FIG. 16.

FIG. 16 is an exemplary diagram illustrating another structure of a test unit applied to a display apparatus according to an embodiment of the present disclosure, FIG. 17 is an exemplary diagram illustrating a cross-sectional surface taken along line D-D' illustrated in FIG. 16, and FIG. 18 is an exemplary diagram illustrating a cross-sectional surface taken along line E-E' illustrated in FIG. 16. In the following description, details which are the same or similar to details described with reference to FIGS. 1 to 15 are omitted or will be briefly described.

First, as described above, the test unit 600 may be provided at ends of the link lines 800 extending from the circuit connection unit 302, and gate pad unit 210 may be provided at ends of the gate link lines 211 connected to the gate driver 200 among the link lines 800.

The link lines 800 may be divided into at least two groups, and the test unit 600 may include at least two jig units 611, 612, 613, and 614 corresponding to the at least two groups.

Each of the at least two jig units 611, 612, 613, and 614 may include division link lines 811*a*, 812*a*, 813*a*, and 814*a* apart from link lines 811, 812, 813, and 814 included in any one of the at least two groups, link connection lines 851, 852, 853, and 854 connected to the division link lines, measurement pads 861, 862, 863, and 864 connected to the link connection lines, and secondary connection lines 871, 872, 873, and 874 connecting the link connection lines 851, 852, 853, and 854 and the measurement pads 861, 862, 863, and 864.

For example, as illustrated in FIG. 16, when the link lines 800 are divided into four groups, the test unit 600 may include four jig units 611, 612, 613, and 614.

In a first jig unit 611, first division link lines 811*a* apart from the first group link lines 811, a first link connection line 851 connected to the first division link line 811*a*, a first measurement pad 861 connected to the first link connection line 851, and a first secondary connection line 871 connecting the first link connection line 851 and the first measurement pad 861 may be provided.

In a second jig unit 612, second division link lines 812*a* apart from the second group link lines 812, a second link connection line 852 connected to the second division link line 812*a*, a second measurement pad 862 connected to the second link connection line 852, and a second secondary connection line 872 connecting the second link connection line 852 and the second measurement pad 862 may be provided.

In a third jig unit 613, third division link lines 813*a* apart from the third group link lines 813, a third link connection line 853 connected to the third division link line 813*a*, a third measurement pad 863 connected to the third link connection line 853, and a third secondary connection line 873 connecting the third link connection line 853 and the third measurement pad 863 may be provided.

In a fourth jig unit 614, fourth division link lines 814*a* apart from the fourth group link lines 814, a fourth link connection line 854 connected to the fourth division link line 814*a*, a fourth measurement pad 864 connected to the fourth link connection line 854, and a fourth secondary connection line 874 connecting the fourth link connection line 854 and the fourth measurement pad 864 may be provided.

The division link lines 811*a*, 812*a*, 813*a*, and 814*a* and the link connection lines 851, 852, 853, and 854 may be connected, as illustrated in FIGS. 16 and 17.

For example, as illustrated in FIGS. 16 and 17, the link connection lines 851, 852, 853, and 854 may be provided on a substrate 101, the link connection lines 851, 852, 853, and 854 may be covered by a first insulating layer 102, main pads 821, 822, 823, and 824 may be provided on the first insulating layer 102, the main pads 821, 822, 823, and 824 may be covered by a second insulating layer 103, the division link lines 811*a*, 812*a*, 813*a*, and 814*a* may be provided on the second insulating layer 103, and the division link lines 811*a*, 812*a*, 813*a*, and 814*a* may be covered by a passivation layer 104.

In this case, the division link lines 811*a*, 812*a*, 813*a*, and 814*a* may be connected to the main pads 821, 822, 823, and 824 through contact holes in the second insulating layer 103, and the main pads 821, 822, 823, and 824 may be connected to the link connection lines 851, 852, 853, and 854 through contact holes in the first insulating layer 102.

For example, as illustrated in FIG. 17, the first division link line 811*a* may be connected to the first main pad 821 through a contact hole in the second insulating layer 103, and the main pad 821 may be connected to the first link connection line 851 through a contact hole in the first insulating layer 102.

Accordingly, the first division link lines 811*a* may be connected to the first link connection line 851 in common. Likewise, the second division link lines 812*a* may be connected to the second link connection line 852 in common, the third division link lines 813*a* may be connected to the third link connection line 853 in common, and the fourth division link lines 814*a* may be connected to the fourth link connection line 854 in common.

The link connection lines 851, 852, 853, and 854 and the measurement pads 861, 862, 863, and 864 may be connected, as illustrated in FIG. 18.

For example, as illustrated in FIGS. 16 to 18, the link connection lines 851, 852, 853, and 854 may be provided on a substrate 101, the link connection lines 851, 852, 853, and 854 may be covered by a first insulating layer 102, the secondary connection lines 871, 872, 873, and 874 may be provided on the first insulating layer 102, the secondary connection lines 871, 872, 873 and 874 may be covered by the second insulating layer 103, the division link lines 811*a*, 812*a*, 813*a*, and 814*a* may be provided on the second insulating layer 103, the division link lines 811*a*, 812*a*, 813*a*, and 814*a* may be covered by a passivation layer 104, and the measurement pads 861, 862, 863, and 864 may be connected to the secondary connection lines 871, 872, 873, and 874 through contact holes in the passivation layer 104 and the second insulating layer 103. Accordingly, the measurement pads 861, 862, 863, and 864 may be exposed to an upper end of the passivation layer 104, and the jig 10 may contact the exposed measurement pads 861, 862, 863, and 864.

In this case, the secondary connection lines 871, 872, 873, and 874 may be connected to the link connection lines 851, 852, 853, and 854 through contact holes in the first insulating layer 102.

For example, as illustrated in FIG. 18, the third secondary connection line 873 may be connected to the third link connection line 853 through a contact hole in the first insulating layer 102.

That is, the third division link lines 813*a* may be connected to the third link connection line 853, and the third link connection line 853 may be connected to the third measurement pad 863 through the third secondary connection line 873. Accordingly, the third division link lines 811*a* may be connected to the third measurement pad 863 in common.

Likewise, the first division link lines 811*a* may be connected to the first measurement pad 861 in common, the second division link lines 812*a* may be connected to the second measurement pad 862 in common, and the fourth division link lines 814*a* may be connected to the fourth measurement pad 864 in common.

As described above, the at least two jig units may include a first jig unit and a second jig unit, and, for example, as illustrated in FIG. 16, may include the first jig unit 611 to the fourth jig unit 614.

In this case, the second link connection line 852 in the second jig unit 612 may overlap the first division link lines 811*a* extending to the first jig unit 611. Also, the third link connection line 853 in the third jig unit 613 may overlap the first division link lines 811*a* extending to the first jig unit 611, the second division link lines 812*a* extending to the second jig unit 612, and the fourth division link lines 814*a* extending to the fourth jig unit 614. Also, the fourth link connection line 854 in the fourth jig unit 614 may overlap the first division link lines 811*a* extending to the first jig unit 611 and the second division link lines 812*a* extending to the second jig unit 612. Because only the first division link lines 811*a* extend in the first jig unit 611, the first link connection line 851 may overlap only the first division link lines 811*a*.

For example, as illustrated in FIG. 17, because the link connection lines 851, 852, 853, and 854 and the first division link line 811*a* are apart from each other with the first insulating layer 102 and the second insulating layer 103 therebetween, even when the link connection lines 851, 852, 853, and 854 and the first division link line 811*a* overlap, the link connection lines 851, 852, 853, and 854 and the first division link line 811*a* may not be electrically connected.

Finally, in a step of manufacturing a display panel and testing a light emission of a display panel, the test unit 600 may be connected to the link lines 800. That is, the first to fourth division link lines 811*a* to 814*a* may be connected to the first to fourth group link lines 811 to 814.

In this case, each of jigs 10 of a light emission test device may be connected to the measurement pads 861, 862, 863, and 864, and thus, signals for a light emission test may be supplied to the signal lines 190 through the measurement pads 861, 862, 863, and 864, the secondary connection lines 871, 872, 873, and 874, link connection lines 851, 852, 853, and 854, the division link lines 811*a*, 812*a*, 813*a*, and 814*a*, and the first to fourth group link lines 811, 812, 813, and 814 from the jigs 10.

Moreover, jigs for the light emission test may be also in contact with each of the gate pads 210*a* in the gate pad unit 210.

Accordingly, signals for the light emission test may be supplied to the data line DL, the first voltage supply line PLA, the second voltage supply line SL, and the gate driver 200, and light may be emitted in the pixels P by the signals for the light emission test.

In this case, pixels in which light is not emitted or light is poorly emitted may be identified, and accordingly, whether the display panel is defective may be determined, and whether a repair process for the display panel should be performed may also be determined.

That is, according to the display apparatus according to an embodiment of the present disclosure as described above, even after the routing line 700 is provided in the display panel 100, the light emission test using the test unit 600 may be performed. Therefore, sales or shipment of the defective display panel 100 may be reduced, and a yield rate of display panels may be enhanced through a repair process for the defective display panels.

However, after the light emission test by the light emission test device is performed, the first to fourth division link lines 811*a* to 814*a* may be apart from the first to fourth group link lines 811 to 814 through a cutting line SC. That is, after the light emission test is performed, the test unit 600 may be not connected to the link lines 800, and in a state where the test unit 600 is not connected to the link lines 800, the display panel according to the present disclosure may be mounted on a display apparatus or an electronic device and used.

In this case, the first to fourth division link lines 811*a* to 814*a* may be apart from the first to fourth group link lines 811 to 814 by using, for example, a laser.

As described above, after the light emission test through the measurement pads 861, 862, 863, and 864 is performed, the link lines 800 extending to the test unit 600, as illustrated in FIG. 16, may be cut along the cutting line SC. Therefore, the test unit 600 may be apart from the link lines 800. Accordingly, even when signals are input to the test unit 600, the signals are no longer transferred to the signal lines 190 through the link lines 800.

Accordingly, a display apparatus or an electronic device in which the display panel is mounted can be normally driven.

In this case, because the secondary connection lines 871, 872, 873, and 874, the link connection lines 851, 852, 853, and 854, the division link lines 811*a*, 812*a*, 813*a*, and 814*a*, and the first to fourth group link lines 811, 812, 813, and 814 are covered by a passivation layer 104, separate attachments for protecting them may not need to be provided in the test unit 600.

Moreover, even when the measurement pads 861, 862, 863, and 864 are exposed to the outside of the passivation layer 104, because signals input through the measurement pads are not transferred to the signal lines 190, the display panel may be used in a state where the measurement pads are exposed.

However, for more perfect insulation, the measurement pads 861, 862, 863, and 864 exposed to the outside may be filled with an insulating material or covered by an insulating tape.

A display apparatus according to the present disclosure may be applied to all electronic devices including display panels. For example, the display apparatus according to the present disclosure may be applied to a mobile device, a video phone, a smart watch, a watch phone, a wearable device, a foldable device, a rollable device, a bendable device, a flexible device, a curved device, an electronic notebook, an e-book, a portable multimedia player (PMP), a personal digital assistant (PDA), MP3 player, a mobile medical device, a desktop PC, a laptop PC, a netbook computer, a workstation, a navigation, a vehicle navigation, a vehicle display, a television, a wallpaper display, a signage device, a game device, a laptop computer, a monitor, a camera, a camcorder, home appliances and the like.

According to an embodiment of the present disclosure, even after a display panel with almost no non-display area is manufactured, whether light is normally output from pixels can be easily identified using a light emission test device. Accordingly, whether the display panel is defective may be determined.

According to an embodiment of the present disclosure, whether light is normally output from pixels can be easily determined using a pad provided on a rear surface of a display panel with almost no non-display area, and thus, whether the display panel is defective can be quickly and easily determined.

According to an embodiment of the present disclosure, a repair process may be performed on various lines provided in a display panel determined to be defective, and thus, a yield rate of display panels may be enhanced.

According to an embodiment of the present disclosure, when a display panel is manufactured by bonding two panels, whether light is normally output from pixels can be determined even after the two panels are bonded.

According to an embodiment of the present disclosure, when a display panel is manufactured by connecting the lines provided on the front and rear surfaces of the panel through routing lines provided on a lateral surface, whether light is normally output can be determined even after the routing lines are provided.

According to an embodiment of the present disclosure, when a display panel is manufactured by connecting the lines provided on the front and rear surfaces of the panel through routing lines provided on a lateral surface or connecting the lines in two panels through the routing lines, a repair process may be performed on a defective routing line even after the routing lines are provided, and thus, a yield rate of display panels may be enhanced.

According to an embodiment of the present disclosure, because a non-display area in which an image is not displayed can be reduced or removed, the immersion of a user may increase.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:

a display panel in which pixels, signal lines connected to the pixels, and gate lines supplying gate signals to the pixels are on a front surface of the display panel;

link lines provided on a rear surface of the display panel and connected to the signal lines provided on the front surface of the display panel, the link lines having a first end and a second end that is spaced apart from the first end on the rear surface of the display panel; and a data driver on an intermediate portion of the link lines that is between the first end and the second end of the link lines, wherein a test unit is attached to the second end of the link lines on the rear surface such that the data driver is between the first end of the link lines and the test unit in a plane view of the display apparatus.

2. The display apparatus of claim 1, wherein main pads connected to the link lines are provided in the test unit.

3. The display apparatus of claim 1, wherein a circuit connection unit connected to a driver for driving the signal lines and the gate lines is provided in the link lines.

4. The display apparatus of claim 3, wherein the test unit is provided at the second end of the link lines extending from the circuit connection unit.

5. The display apparatus of claim 1, wherein the link lines are divided into at least two groups, the test unit comprises at least two jig units corresponding to the at least two group, and the at least two groups comprise:

a first group including first group link lines supplying first data voltage to a first pixel among the pixels; and a second group including second group link lines supplying second data voltage to a second pixel among the pixels.

6. The display apparatus of claim 5, wherein the first pixel comprises a first color pixel displaying a first color and a second color pixel displaying a second color, and the second pixel comprises a third color pixel displaying a third color and a fourth color pixel displaying a fourth color.

7. The display apparatus of claim 5, wherein the at least two groups further comprise a pixel driving voltage line group including link lines supplying pixel driving voltages to pixel driving circuits included in the pixels.

8. The display apparatus of claim 1, wherein the link lines are divided into four groups, and the test unit comprises:

a first jig unit provided with first main pads connected to first group link lines included in a first group among the four groups;

a second jig unit provided with second main pads connected to second group link lines included in a second group among the four groups;

a third jig unit provided with third main pads connected to third group link lines included in a third group among the four groups; and a fourth jig unit provided with fourth main pads connected to fourth group link lines included in a fourth group among the four groups.

9. The display apparatus of claim 8, wherein each of the first group link lines is connected to a first data line connected to a first pixel among the pixels, each of the second group link lines is connected to a second data line connected to a second pixel among the pixels, each of the third group link lines is connected to a first voltage supply line provided in the pixels, and each of the fourth group link lines is connected to a second voltage supply line provided in the pixels.

10. The display apparatus of claim 1, wherein the link lines are divided into at least two groups, the test unit comprises at least two jig units corresponding to the at least two groups, and first main pads connected to first group link lines included in a first group of the at least two groups, first secondary pads apart from the first main pads, and a first connection line connected to the first secondary pads are provided in a first jig unit of the at least two jig units.

11. The display apparatus of claim 1, wherein the link lines are divided into at least three groups, the test unit comprises at least three jig units corresponding to the at least three groups, a first jig unit, a second jig unit, and a third jig unit of the at least three jig units correspond to a first group, a second group, and a third group of the at least three groups, respectively, in each of the first jig unit and the second jig unit, main pads connected to link lines, secondary pads apart from the main pads, and a connection line connected to the secondary pads are provided, and in the third jig unit, main pads connected to link lines and a connection line connected to the main pads are provided.

12. The display apparatus of claim 1, wherein the link lines are divided into at least two groups, the test unit comprises at least two jig units corresponding to the at least two groups, and each of the at least two jig units comprises:

division link lines apart from link lines included in any one of the at least two groups;

link connection lines connected to the division link lines; and measurement pads connected to the link connection lines.

13. A display apparatus comprising:

a display panel in which pixels, signal lines connected to the pixels, and gate lines supplying gate signals to the pixels are provided; and link lines provided on a rear surface of the display panel and connected to the signal lines provided on a front surface of the display panel, wherein a test unit is provided at ends of the link lines on the rear surface, the link lines are divided into at least two groups, the test unit comprises at least two jig units corresponding to the at least two group, and the at least two groups comprise:

a first group including first group link lines supplying first data voltage to a first pixel among the pixels; and a second group including second group link lines supplying second data voltage to a second pixel among the pixels.

* * * * *